US012442522B2

(12) United States Patent
Christensen et al.

(10) Patent No.: US 12,442,522 B2
(45) Date of Patent: Oct. 14, 2025

(54) LIGHTING ASSEMBLY

(71) Applicant: VIDENDUM PRODUCTION SOLUTIONS INC., Shelto, CT (US)

(72) Inventors: Bo Christensen, Shelton, CT (US); AJ Sincic, Shelton, CT (US); David Pasko, Shelton, CT (US); Michael Herbert, Shelton, CT (US)

(73) Assignee: VIDENDUM PRODUCTION SOLUTIONS INC., Shelton, CT (US)

( * ) Notice: Subject to any disclaimer, the term of this patent is extended or adjusted under 35 U.S.C. 154(b) by 0 days.

(21) Appl. No.: 19/190,237

(22) Filed: Apr. 25, 2025

(65) Prior Publication Data

US 2025/0251117 A1 Aug. 7, 2025

Related U.S. Application Data

(63) Continuation of application No. PCT/US2025/012665, filed on Jan. 23, 2025.
(Continued)

(51) Int. Cl.
*F21V 21/30* (2006.01)
*F21S 2/00* (2016.01)
(Continued)

(52) U.S. Cl.
CPC ................ *F21V 21/30* (2013.01); *F21S 2/00* (2013.01); *F21S 6/006* (2013.01); *F21S 8/043* (2013.01);
(Continued)

(58) Field of Classification Search
CPC ...... F21V 21/30; F21V 29/507; F21V 21/108; F21V 21/26; F21V 23/008; F21V 21/40;
(Continued)

(56) References Cited

U.S. PATENT DOCUMENTS 5,424,931 A * 6/1995 Wheeler ................. F21V 21/14 362/418
6,409,134 B1 6/2002 Oddsen
(Continued)

FOREIGN PATENT DOCUMENTS

WO 2010097525 A1 9/2010
WO 2022064005 A1 3/2022

OTHER PUBLICATIONS

Search Report and Written Opinion issued in corresponding International Patent Application No. PCT/US2025/012665, dated Apr. 3, 2025, 10 pages.

*Primary Examiner* — Laura K Tso
(74) *Attorney, Agent, or Firm* — Morgan, Lewis & Bockius LLP

(57) ABSTRACT

A lighting assembly includes a lighting apparatus that includes a component housing that receives a light source and first and compartments for housing electronic components, the second compartment spaced from the first compartment by a channel. The lighting apparatus includes a mounting assembly that includes a first joint received within the channel, coupled to the component housing, and translatable along the channel between a use position and a stowage position. The mounting assembly also includes a mount arm coupled to the component housing by the first joint and rotatable relative to the joint about a pivot axis. When the first joint is in the use position the pivot axis extends through a center of gravity of the lighting apparatus.

23 Claims, 25 Drawing Sheets

Related U.S. Application Data

(60) Provisional application No. 63/623,971, filed on Jan. 23, 2024.

(51) Int. Cl.

| | |
|---|---|
| ***F21S 6/00*** | (2006.01) |
| ***F21S 8/04*** | (2006.01) |
| ***F21S 8/08*** | (2006.01) |
| ***F21V 14/02*** | (2006.01) |
| ***F21V 21/108*** | (2006.01) |
| ***F21V 21/26*** | (2006.01) |
| ***F21V 21/40*** | (2006.01) |
| ***F21V 23/00*** | (2015.01) |
| ***F21V 29/507*** | (2015.01) |

(52) U.S. Cl.

CPC ................ *F21S 8/08* (2013.01); *F21V 14/02* (2013.01); *F21V 21/108* (2013.01); *F21V 21/26* (2013.01); *F21V 21/40* (2013.01); *F21V 23/008* (2013.01); *F21V 29/507* (2015.01)

(58) Field of Classification Search

CPC . F21V 14/02; F21S 8/043; F21S 6/006; F21S 2/00; F21S 8/08

USPC .......................................................... 362/427

See application file for complete search history.

(56) References Cited

U.S. PATENT DOCUMENTS

| | | | |
|---|---|---|---|
| 6,450,668 | B1 | 9/2002 | Kotloff |
| 6,478,274 | B1 | 11/2002 | Oddsen |
| 6,517,216 | B1 | 2/2003 | Cercone et al. |
| 6,554,238 | B1 | 4/2003 | Hibberd |
| 6,609,691 | B2 | 8/2003 | Oddsen |
| 6,619,606 | B2 | 9/2003 | Oddsen et al. |
| 6,726,167 | B2 | 4/2004 | Oddsen |
| 6,758,454 | B2 | 7/2004 | Smed |
| 6,905,101 | B1 | 6/2005 | Dittmer |
| 6,915,994 | B2 | 7/2005 | Oddsen |
| 7,014,157 | B2 | 3/2006 | Oddsen |
| 7,017,874 | B2 | 3/2006 | Oddsen |
| 7,028,961 | B1 | 4/2006 | Dittmer et al. |
| 7,066,433 | B2 | 6/2006 | Oddsen |
| 7,100,880 | B2 | 9/2006 | Oddsen |
| 7,387,286 | B2 | 6/2008 | Dittmer et al. |
| 7,395,996 | B2 | 7/2008 | Dittmer |
| 7,487,944 | B2 | 2/2009 | Tisbo et al. |
| 7,510,154 | B2 | 3/2009 | Oddsen et al. |
| 7,673,838 | B2 | 3/2010 | Oddsen et al. |
| 7,823,849 | B2 | 11/2010 | Dittmer et al. |
| 7,954,780 | B2 | 6/2011 | Dittmer |
| 8,235,342 | B2 | 8/2012 | Pfister et al. |
| 8,366,060 | B2 | 2/2013 | Hung |
| 8,794,579 | B2 | 8/2014 | Sturman et al. |
| 9,279,536 | B2 | 3/2016 | Dittmer et al. |
| 9,298,213 | B2 | 3/2016 | Khor et al. |
| 9,651,232 | B1 | 5/2017 | Fletcher et al. |
| 9,833,133 | B2 | 12/2017 | Stone |
| 10,621,946 | B2 | 4/2020 | Chen et al. |
| 10,738,940 | B2 | 8/2020 | Hung |
| 10,753,529 | B2 | 8/2020 | Hung |
| 10,832,629 | B2 | 11/2020 | Chen et al. |
| 10,845,000 | B2 | 11/2020 | Lau |
| 10,851,938 | B2 | 12/2020 | Glickstein et al. |
| 10,914,420 | B2 | 2/2021 | Hung |
| 10,935,179 | B2 | 3/2021 | Hung |
| 10,976,001 | B2 | 4/2021 | Hung |
| 11,002,402 | B2 | 5/2021 | Vlaar |
| 11,131,421 | B2 | 9/2021 | Hung |
| 11,153,527 | B1 | 10/2021 | Webster et al. |
| 11,293,584 | B2 | 4/2022 | Kleist |
| 11,348,551 | B2 | 5/2022 | Chen et al. |
| 11,486,537 | B2 | 11/2022 | Glickstein et al. |
| 2008/0237439 | A1 | 10/2008 | Oddsen |
| 2010/0212139 | A1 | 8/2010 | Oddsen |
| 2012/0127700 | A1* | 5/2012 | Parsons ................. F16M 13/02 362/131 |
| 2012/0132771 | A1 | 5/2012 | Wang |
| 2014/0355278 | A1 | 12/2014 | Huang |
| 2022/0126016 | A1 | 4/2022 | Cox et al. |

* cited by examiner

LIGHTING ASSEMBLY

CROSS-REFERENCE TO RELATED APPLICATIONS

This application is a continuation of International Patent Application No. PCT/US2025/012665 filed Jan. 23, 2025, which claims the benefit of U.S. Provisional Patent Application No. 63/623,971 filed Jan. 23, 2024 entitled “Lighting Assembly”, which is incorporated by reference herein in its entirety.

TECHNICAL FIELD

The present disclosure generally relates to light sources and, in some embodiments, to a lighting assembly with an adjustable mount.

SUMMARY

In one embodiment there is a lighting assembly including a lighting apparatus that includes a component housing having a front side receiving one or more light sources and a rear side including a first compartment and a second compartment each for housing electronic components for controlling operation of the one or more light sources, the second compartment being spaced from the first compartment by a channel and a mounting assembly configured to adjustably couple the lighting apparatus to a support such that the orientation of the lighting apparatus may be selectively adjusted relative to the support, the mounting assembly including a first joint received within the channel and coupled to the component housing, the first joint being translatable along the channel between a use position and a stowage position, a mount arm coupled to the component housing by the first joint and rotatable relative to the joint about a pivot axis, when the first joint is in the use position the pivot axis extends through a center of gravity of the lighting apparatus.

In some embodiments, the first joint passes through the center of gravity of the lighting apparatus when in the use position. In some embodiments, the first joint includes a pivot shaft extending along the pivot axis, and when the first joint is in the use position the center of gravity is located at a geometric center of the pivot shaft. In some embodiments, the center of gravity is exterior to the component housing and located within the channel between the first and second compartments. In some embodiments, when the first joint is in the stowage position the pivot axis is offset from the center of gravity of the lighting apparatus. In some embodiments, the first joint is detachably coupled to the component housing.

In some embodiments, the component housing is rotatable relative to the mount arm only about the pivot axis. In some embodiments, an inner sidewall of the first compartment and an inner sidewall of the second compartment at least partially define the channel. In some embodiments, the channel is open at a top and bottom surface of the lighting apparatus. In some embodiments, the lighting apparatus further includes a frame coupled to the component housing along a perimeter thereof and defining a maximum length, width and height of the lighting apparatus. In some embodiments, when the first joint is in the stowage position the mounting assembly is contained entirely within a volume defined by the maximum length, width and height of the lighting apparatus. In some embodiments, the lighting assembly further includes a control panel positioned at a rear surface of one of the first and second compartments, the control panel configured to permit a user to control operation of the one or more light sources.

In some embodiments, the lighting assembly further includes an air vent at an outer sidewall of the first compartment and/or second compartment configured to permit air flow between an interior of the component housing and an environment surrounding the component housing. In some embodiments, the first and second compartments have a generally trapezoidal prism shape. In some embodiments, a mouth of the channel at a rear surface of first and second compartments has a width greater than a width of a base wall of the channel. In some embodiments, a base wall in channel has a track that restricts the translation of the first joint along the channel. In some embodiments, the mounting assembly further includes a support attachment pin configured to couple the mount arm to the support, and a second joint coupling the mount arm to the support attachment pin.

In some embodiments, the support attachment pin extends along a longitudinal axis defining a first axis of rotation for the lighting apparatus relative to the support when the lighting apparatus is coupled to the support by the mounting assembly. In some embodiments, the second joint defines a second axis of rotation for the lighting apparatus relative to the support that is perpendicular to the longitudinal axis of the support attachment pin. In some embodiments, the first joint is positioned within a perimeter of the lighting apparatus. In some embodiments, the first joint is a ball joint. In some embodiments, the center of gravity of the lighting apparatus is offset from a center of geometry of the lighting apparatus.

In another embodiments there is a lighting assembly including a lighting apparatus. The lighting apparatus including a component housing having a front side receiving one or more light sources and a rear side including a first compartment, a second compartment and a third component each for housing electronic components for controlling operation of the one or more light sources, the second compartment being spaced from the first compartment by a first channel and the third compartment being spaced from the second compartment by a second channel. The lighting assembly further including a mounting assembly configured to adjustably couple the lighting apparatus to a support such that the orientation of the lighting apparatus may be selectively adjusted relative to the support. The mounting assembly including a first joint received within the first channel and coupled to the component housing, the first joint being translatable along the first channel between a use position and a stowage position, a second joint received within the second channel and coupled to the component housing, the second joint being translatable along the second channel between the use position and the stowage position, and a mount arm coupled to the component housing by the first joint and second joint and rotatable relative to the first and second joints about a common pivot axis. When the first and second joint in the use position the common pivot axis extends through a center of gravity of the lighting apparatus.

BRIEF DESCRIPTION OF THE DRAWINGS

The following detailed description of embodiments of the lighting assembly, will be better understood when read in conjunction with the appended drawings of exemplary embodiments. It should be understood, however, that the invention is not limited to the precise arrangements and instrumentalities shown.

In the drawings.

DETAILED DESCRIPTION

Figure 1:
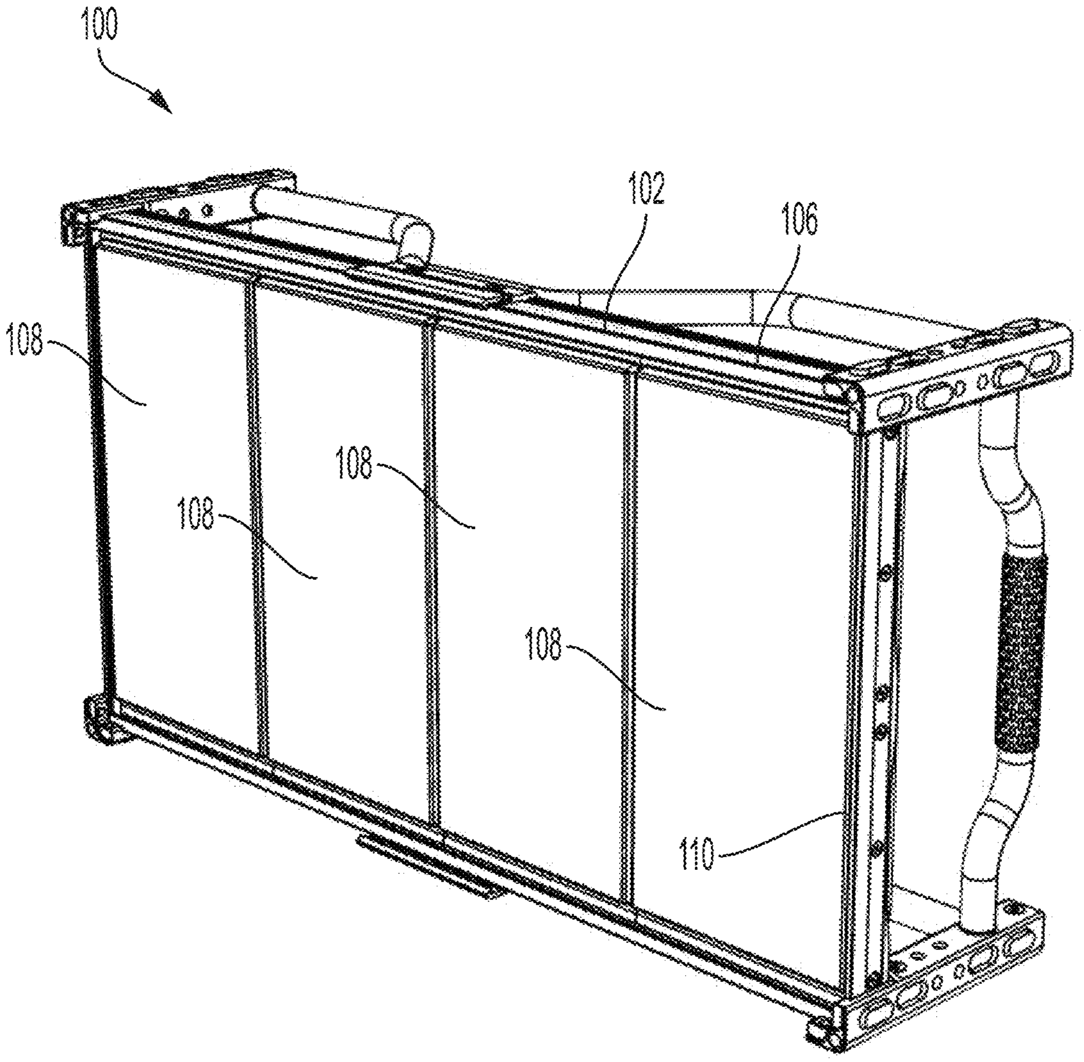
FIG. 1 is a front perspective view of a lighting assembly in accordance with an exemplary embodiment of the present disclosure.

Conventional lamps and light panels, especially those used in photography and filmmaking, often utilize a light stand mount assembly having a yoke that extends around a periphery of the lamp or light panel and connects to opposed, exterior sides of the light panel to provide for at least one degree of articulation. However, the conventional mount assemblies of light panels often obscure access to the hardware of the light panel making it difficult for users to reorient and operate said light panels. Additionally, cables used to supply power and/or transmit data to the light panels often interfere with rotation of conventional light panels due to the structure of the conventional mount assemblies. Moreover, the addition of an exterior yoke will also increase one or more dimensions of the assemblies and may therefore require more space for use and storage. As such, there is a need to provide a lighting assembly including an adjustable mount configured to address at least the above-mentioned shortcomings of conventional light panels.

Referring to the drawings in detail, wherein like reference numerals indicate like elements throughout, there is shown in FIGS. 1-11 a lighting assembly, generally designated 100, in accordance with an exemplary embodiment of the present invention. In some embodiments, the lighting assembly 100 includes a mounting assembly configured to pass through the center of gravity of a lighting apparatus. In some embodiments, the mounting assembly is configured to be stowed with the lighting apparatus and within the outer perimeter thereof such that the lighting assembly 100 can be easily stored. In some embodiments, the mounting assembly is configured to enable a user to easily adjust the orientation of the lighting apparatus without interfering with any cables connected thereto.

Figure 2:
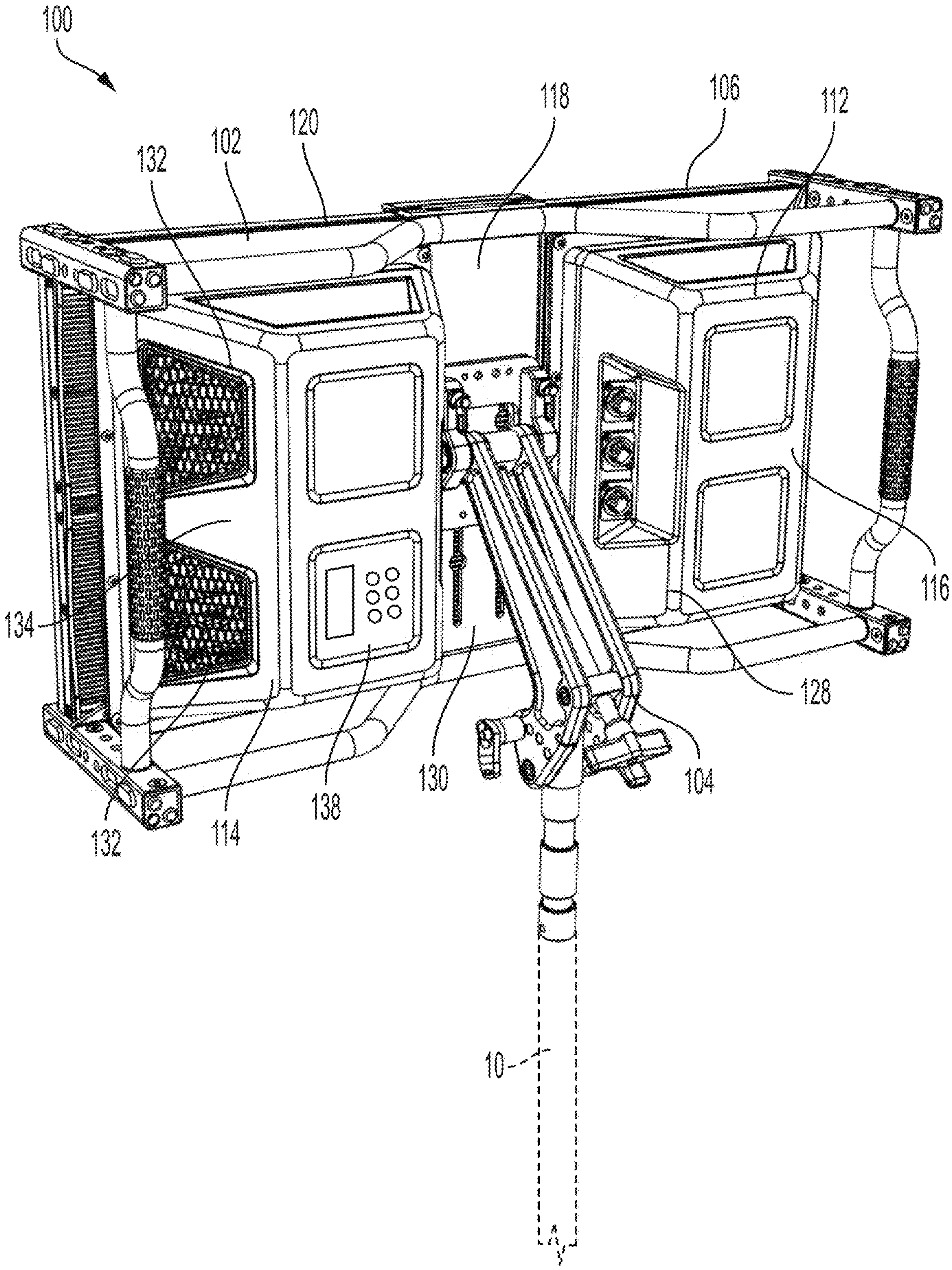
FIG. 2 is a rear perspective view of the lighting assembly of FIG. 1.

Referring to FIGS. 1-2, the lighting assembly 100 includes a lighting apparatus 102 and a mounting assembly 104 configured to couple the lighting apparatus to a support 10. The support 10 may be any desired support structure and/or hardware for mounting the lighting assembly 100 thereto. For example, the support 10 may be, but is not limited to, a light stand, tripod, scaffolding, or a lighting truss. In some embodiments, the mounting assembly 104 is configured to allow the position and/or orientation of the lighting apparatus 102 relative to the support 10 to be adjusted. For example, the mounting assembly 104 may include one or more points of articulation to enable a user to adjust the position and/or orientation of the lighting apparatus 102 relative to the support 10 as desired.

The lighting apparatus 102 may be configured to provide one or more sources of illumination and control operation thereof. In some embodiments, the lighting apparatus 102 includes a component housing 106 configured to receive one or more light sources 108 and house one or more components (e.g., hardware, electronic components) for controlling operation of the light sources 108. The component housing 106 may be a generally rigid structure defining one or more internal cavities for housing the electronic components that control operation of the light sources 108. In some embodiments, the component housing 106 includes a front side 110 for receiving the one or more light sources 108 and a rear side 112 for housing the electronic components associated with operation of the light sources 108. The light sources 108 may be attached to the front side 110 of the component housing 106 and face outwardly therefrom such that light emitted by the light sources 108 is directed away from the lighting apparatus 102.

In some embodiments, the lighting apparatus 102 includes at least one light source 108 coupled to the front side 110 of the component housing 106. In some embodiments, there are a plurality of light sources 108 coupled to the component housing 106. For example, and as illustrated in FIG. 1, the lighting apparatus 102 includes four light sources 108 coupled to the component housing 106 and substantially covering the front side 110 of the component housing 106. In other embodiments, the lighting apparatus 102 includes a single light source 108 coupled to the component housing 106 and substantially covering the front side 110 thereof. In some embodiments, the lighting apparatus 102 includes between one to ten light sources coupled to the front side 110 of the component housing 106. In some embodiments, the light sources 108 cover at least 90% of the surface area of the front side 110 of the component housing 106. In other embodiments, the one or more light sources 108 cover less than 90% of the surface area of the front side 110 of the component housing 106. For example, in one embodiment the lighting apparatus 102 includes a single light source 108 coupled to the front side 110 thereof and covering about 25% of the surface area of the front side 110. In some embodiments, the one or more light sources 108 are light panels that may each include a plurality of light emitting diodes (LEDs). In some embodiments, the plurality of LEDs may be arranged in one or more arrays. In further embodiments, the one or more light sources 108 may include, for example, incandescent, fluorescent, halogen, gas-discharge, or other electric lamps. In some embodiments, light sources 108 may each include one or more tube lights and/or one or more light bulbs.

Figure 3:
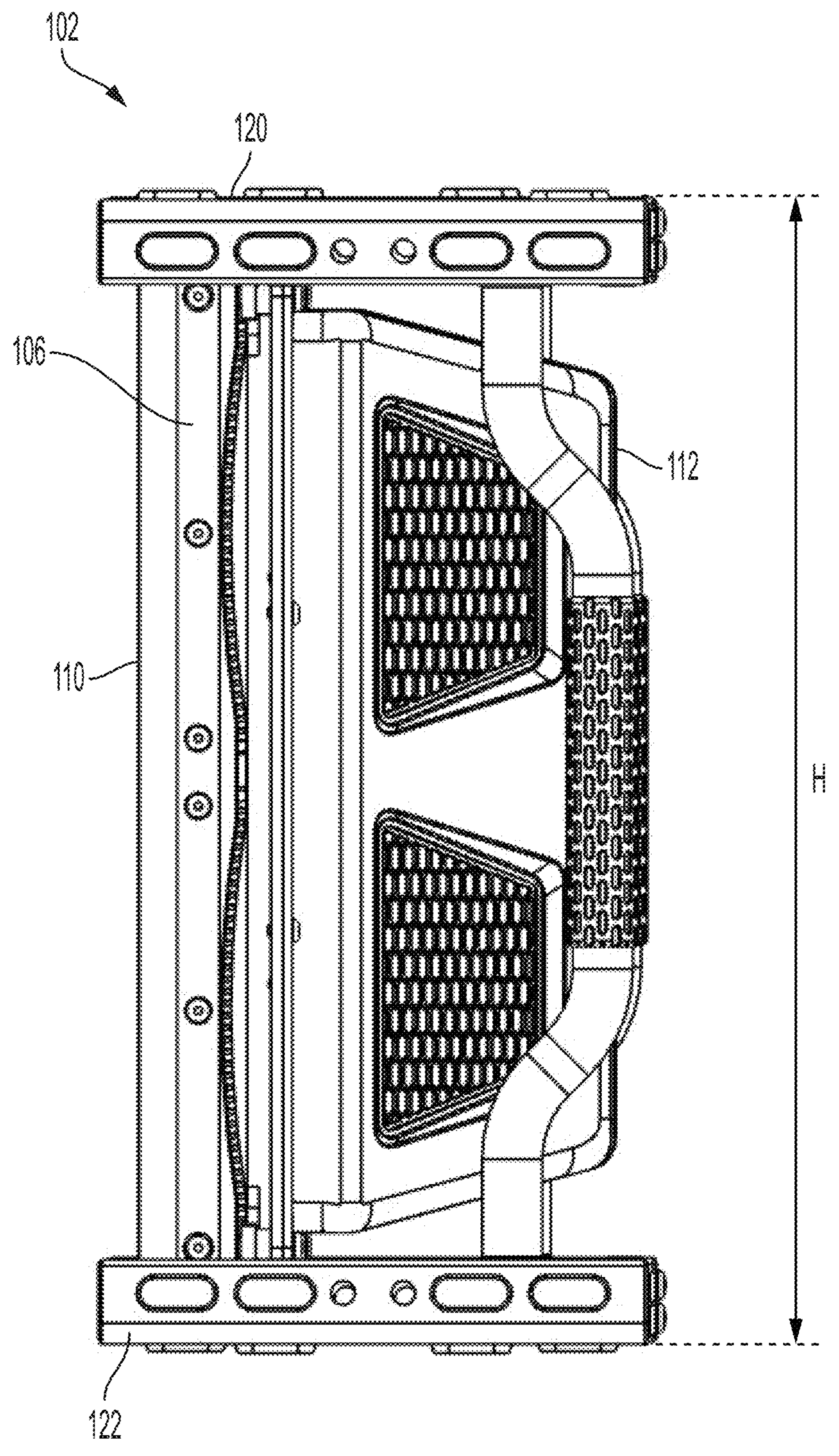
FIG. 3 is a side elevational view of the lighting apparatus of the lighting assembly of FIG. 1 with the mounting assembly removed.
Figure 4:
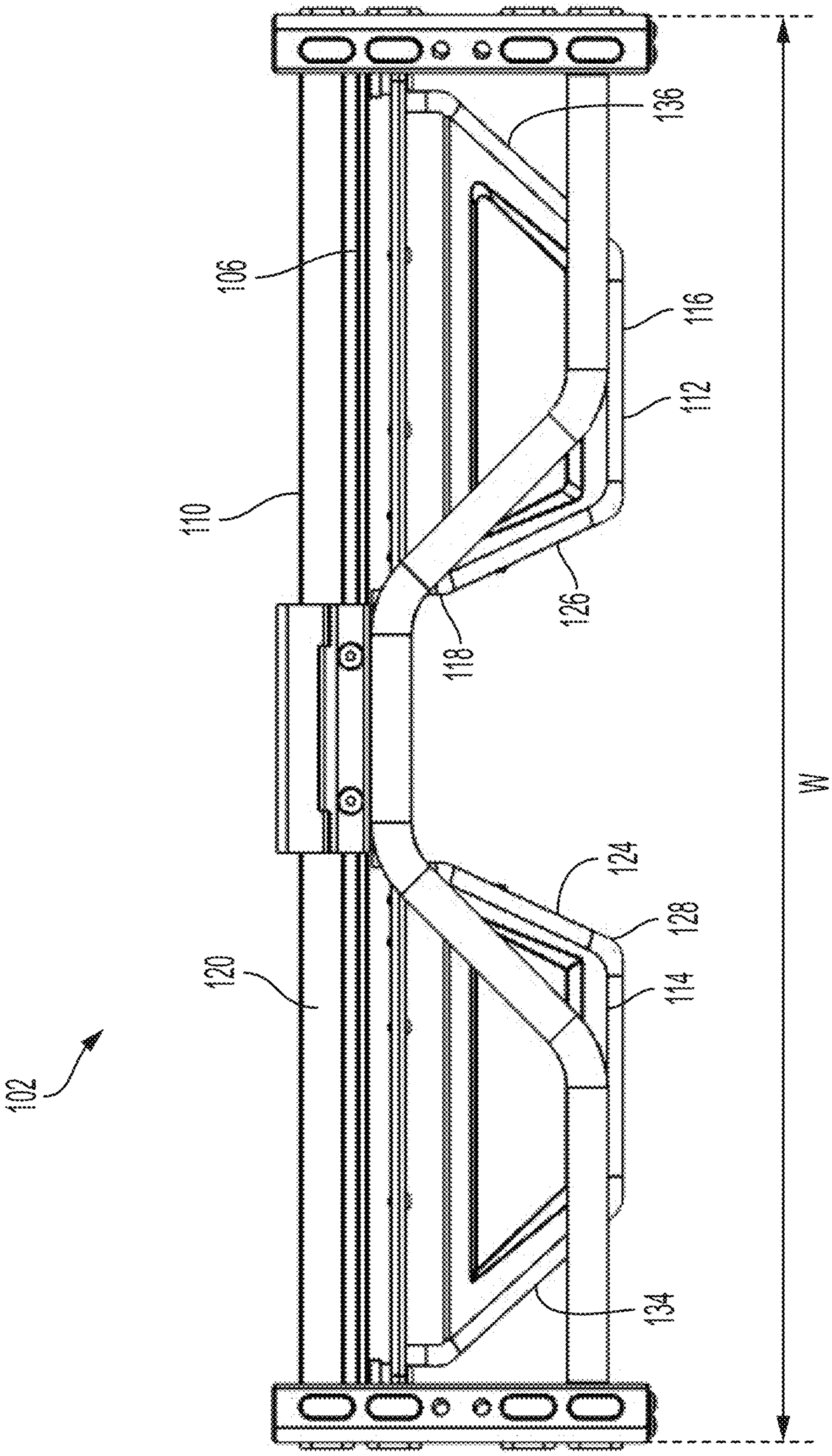
FIG. 4 is a top plan view of the lighting apparatus of the lighting assembly of FIG. 1 with the mounting assembly removed.

Referring to FIGS. 2-4, in some embodiments, the rear side 112 of the component housing 106 includes one or more compartments for housing the electronic components that control operation of the one or more light sources 108 (shown in FIG. 1). In some embodiments, the component housing 106 includes two or more such compartments. As shown in the embodiment of FIGS. 2-4, the component housing 106 may include a first compartment 114 and a second compartment 116 each configured to house the electronic components for controlling operation of the one or more light sources 108. In some embodiments, the first compartment 114 and second compartment 116 each define respective inner cavities within which the electronic components may be positioned. For example, the first and second compartments 114, 116 may each include a generally rigid shell having an interior surface defining the cavity within which the electronic components are positioned.

In some embodiments, the first compartment 114 and second compartment 116 are spaced from one another by a channel 118 configured to receive the mounting assembly 104. The channel 118 may be located at the rear side 112 of the component housing 106 and be positioned between the first and second compartments 114, 116. In some embodiments, the channel 118 extends from a top surface 120 of the lighting apparatus 102 to the bottom surface 122 thereof. For example, the channel 118 may extend along the rear side 112 of the lighting apparatus 102 by a distance generally equal to the height H of the lighting apparatus. As such, in some embodiments, the channel 118 is open at the top and bottom surfaces 120, 122 of the lighting apparatus 102. In this manner, the channel 118 may be easily accessible to a user for attaching and/or adjusting the mounting assembly 104 to the lighting apparatus 102. In other embodiments, the channel 118 may extend partially along the height H of the lighting apparatus 102. In some embodiments, the channel 118 is generally centered along the width W of the lighting apparatus 102.

In some embodiments, the channel 118 is at least partially defined by the first and second compartments 114, 116. The first compartment 114 and second compartment 116 may each include an inner sidewall 124, 126 respectively that at least partially defines the channel 118. In some embodiments, the shape, size and/or orientation of the channel 118 is at least partially defined by the inner sidewalls 124, 126 of the first and second compartments 114, 116. For example, the inner sidewalls 124, 126 may each be sloped or curved with respect to the width of the lighting apparatus 102. Further to this example, the inner sidewalls 124, 126 result in the mouth 128 of the channel 118 at the rear surface of the first and second compartments 114, 116 being wider than a base wall 130 of the channel 118. By providing a channel 118 having a mouth 128 that is wider than the base wall 130 thereof may enable users to more easily interact with the mounting assembly 104 and/or facilitate for stowage of the mounting assembly 104 while it is attached to the lighting apparatus 102, as discussed in more detail below. In some embodiments, the first and second compartments 114, 116 each have a generally trapezoidal prism shape that at least partially defines the shape, size and/or orientation of the channel 118. It should be understood though that the compartment housings 114, 116 may be any shape and/or size as desired according to other embodiments and are not necessarily limited to the illustrated shape.

In some embodiments, the first and/or second compartments 114, 116 of the compartment housing 106 are configured to provide airflow to the electronic components housed within. For example, there may be at least one air vent 132 to permit airflow between the interior of the component housing 106 and the external environment. In some embodiments, each of the first compartment 114 and second compartment 116 includes at least one air vent 132 positioned along an outer sidewall 134, 136 thereof. For example, and as shown in FIGS. 2-3, the first compartment 114 includes two air vents 132 positioned at the outer sidewall 134 thereof. Although not shown, the second compartment 116 may include two air vents 132 positioned at the outer sidewall 136 thereof in generally the same manner as the first compartment 114. In some embodiments, there are at least two air vents 132 at each of the outer sidewalls 134, 136. In some embodiments, there are one or more air vents 132 positioned along the top, bottom, and/or rear surfaces of the first and second compartments 114, 116.

In some embodiments, the lighting assembly 100 includes a control panel 138 for controlling operation of the one or more light sources 108. The control panel 138 may be in electrical communication with the electronic components housed within the first and/or second compartments 114, 116. As such, a user may interact with the control panel 138 to control operation of the one or more light sources 108 that are in electrical communication with the electronic components. In some embodiments, the control panel 138 is positioned at a rear surface of one of the first and second compartments 114, 116. For example, and as illustrated in FIG. 2, the control panel 138 is positioned at the rear surface of the first compartment 114. In other embodiments, the control panel 138 may be positioned at the rear surface of the second compartment 116. The control panel 138 may be spaced from the channel 118 and/or mounting assembly 104 such that a user may easily access the control panel 138 without being obstructed by the mounting assembly 104.

Figure 5:
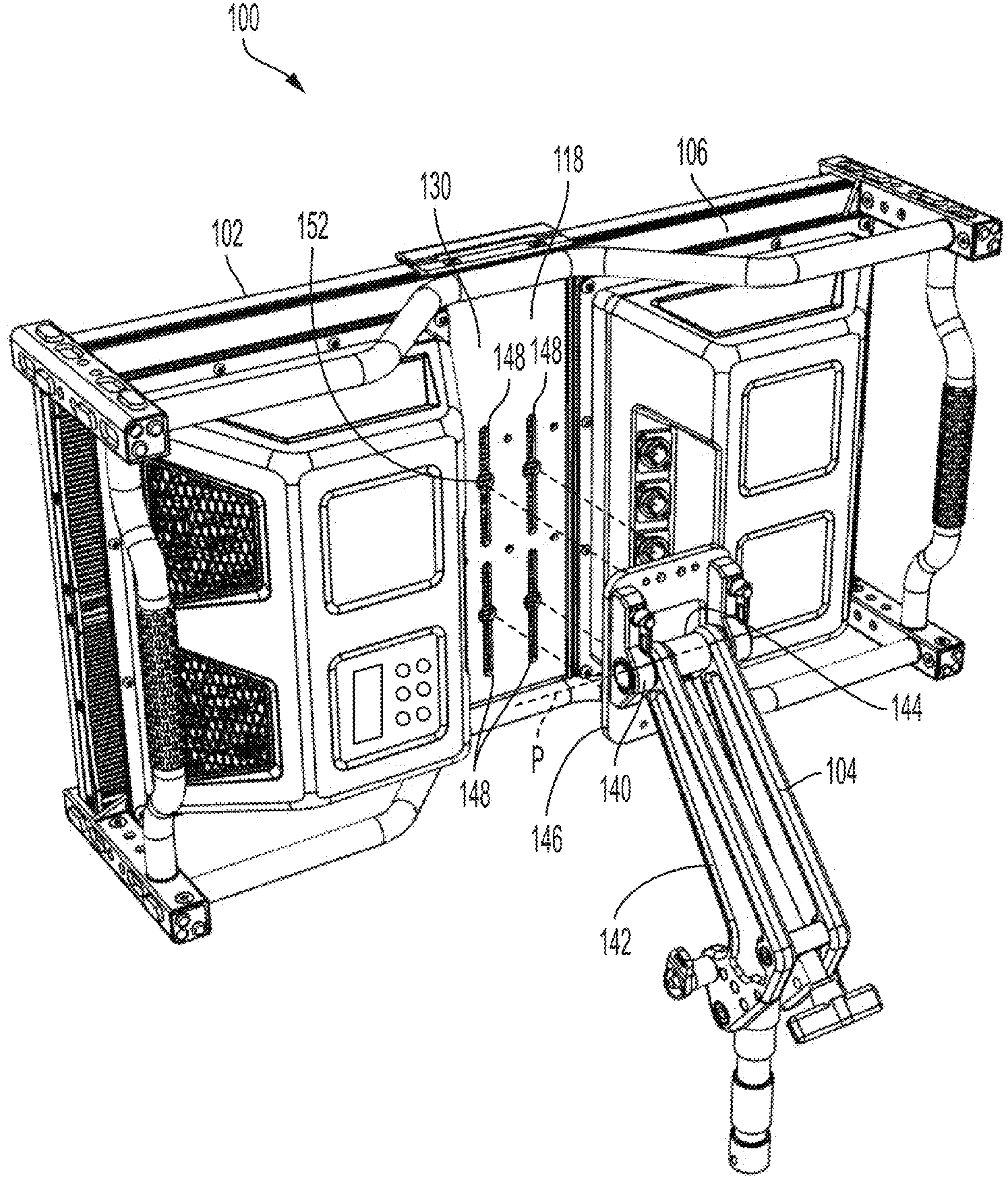
FIG. 5 is a rear perspective view of the lighting assembly of FIG. 1.

Referring to FIG. 5 in some embodiments, the mounting assembly 104 is configured to be coupled to the lighting apparatus 102 via the channel 118 of the component housing 106. The mounting assembly 104 may include a first joint 140 configured to be received within the channel 118 and a mount arm 142 coupled to the first joint 140. In some embodiments, the first joint 140 includes a revolute joint, e.g., a hinge. For example, the first joint 140 may include a pivot shaft 144 and coupling the mount arm 142 to the first joint 140. In some embodiments, the pivot shaft 144 extends along a pivot axis P. For example, the pivot shaft 144 may be a cylindrical shaft having an outer surface defined by a generally continuous radius of curvature about the pivot axis P and that extends longitudinally in a direction generally parallel to the pivot axis P. In some embodiments, the first joint 140 is positioned within a perimeter of the lighting apparatus 102. In some embodiments, the first joint 140 is configured to allow lighting apparatus 102 to articulate with mount arm 142 in only one degree of freedom (e.g., rotate about pivot axis P), or at least one degree of freedom. In some embodiments, the first joint 140 may be configured to allow lighting apparatus to articulate with mount arm 142 in more than one degree of freedom. For example, first joint 104 in some embodiments may be configured as a ball joint that allows pivoting of lighting apparatus 102 about pivot axis P and other axes. In some embodiments, the lighting apparatus 102 is rotatable about the pivot axis P by about 180°.

In some embodiments, the first joint 140 is configured to couple the mount arm 142 to the component housing 106. The first joint 140 may include a mounting plate 146 coupled to the mount arm 142 via the pivot shaft 144. In some embodiments, the mounting plate 146 is configured to be coupled to the component housing 106 via one or more tracks 148 in the base wall 130 of the channel 118. The tracks 148 may be apertures extending at least partially along the channel 118 and sized to receive corresponding mating features (not shown) of the mounting plate 146. For example, the mounting plate 146 may include one or more male mating features (e.g., protrusions) extending outwardly from the mounting plate 146 away from the pivot shaft 144. The mating features may be sized to be received within the tracks 148 such that when received therein the mating features couple the mounting plate 146 to the channel 118.

In the example illustrated in FIG. 5, the channel 118 includes four tracks 148 each having the generally the same size, shape and orientation. Further to this example, the mounting plate 146 includes four mating features each being sized, shaped and positioned along the front surface of the mounting plate 146 such that they may be received within the corresponding tracks 148. In some embodiments, the tracks 148 are arranged on the base wall 130 of the channel 118 in a 2×2 grid pattern. For example, and as illustrated in FIG. 5, the four tracks 148 extend through the base wall 130 and are arranged in a grid of two rows and two columns, each track 148 being spaced from one another. In some embodiments, by providing four tracks 148 spaced from one another and arranged in a 2×2 grid the stability of the mounting assembly 104 coupled thereto may be achieved while maintaining the structural integrity of the base wall 130. For example, the four tracks 148 are arranged such that the mounting plate 146 has four contact points with the base wall 130 forming a rectangular pattern thereby providing stability to the mounting plate 146 over two axes. Further to this example, by providing the apertures defining the four tracks 148 each spaced from one another, the strength of the base wall 130 may be substantially similar to that of a base wall 130 devoid of any apertures. It should be understood though that the arrangement and/or number of tracks 148 may be adjusted as desired. For example, in one embodiment the two tracks 148 within the same column may form a single track. In such embodiments, the mounting plate 146 may include at least two, at least four, or at least six mating features.

Figure 6A:
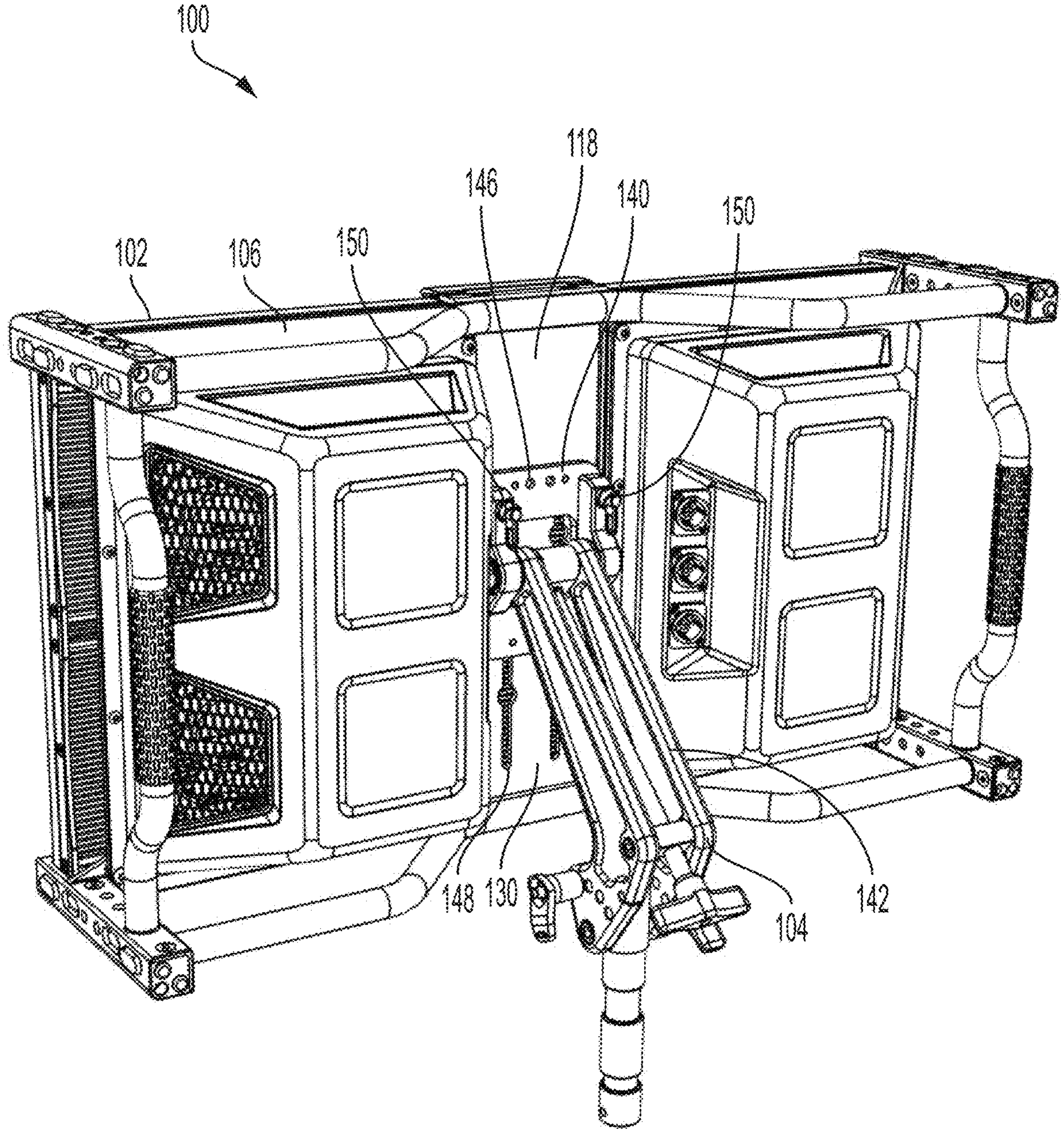
FIGS. 6A-6C are rear perspective views of the lighting assembly of FIG. 1 transitioning from a use position, shown in FIG. 6A, to a stowage position, shown in FIG. 6C.
Figure 6B:
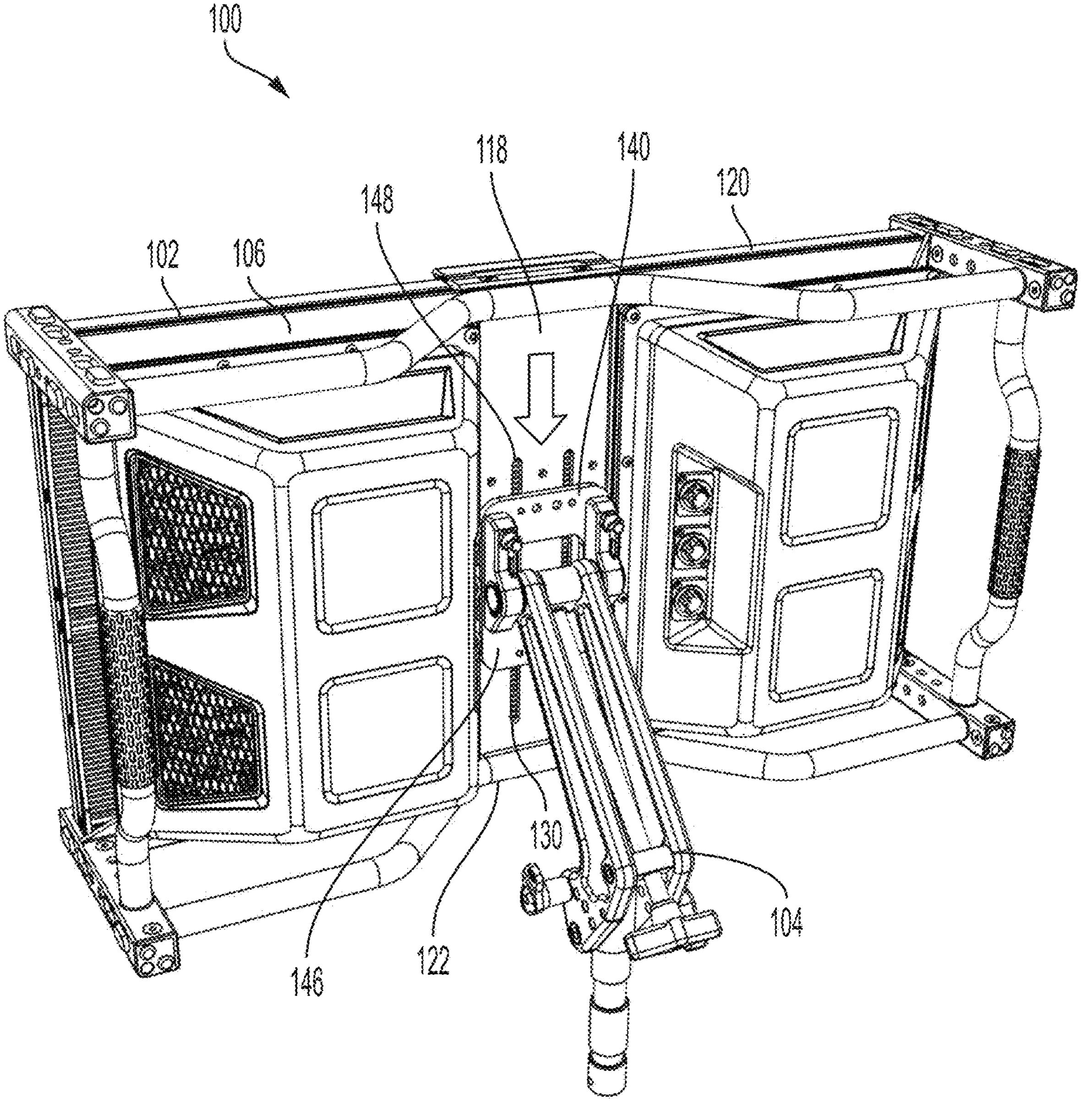
Figure 6C:
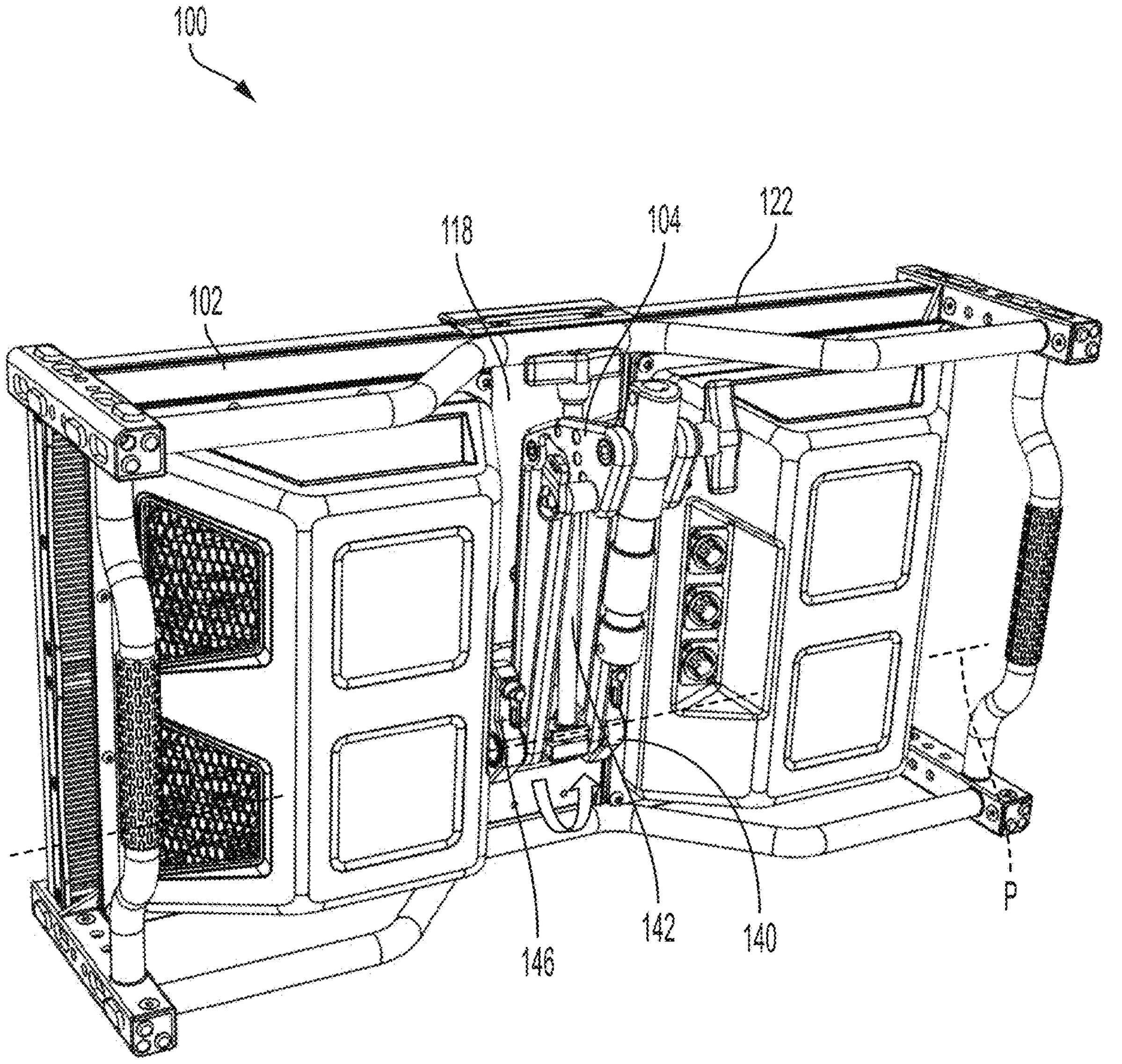

Referring to FIGS. 6A-6C, in some embodiments, the first joint 140 of the mounting assembly is translatable relative to the component housing 106 between a use position (e.g., as shown in FIG. 6A) and a stowage position (e.g., as shown in FIG. 6C). The first joint 140 may be translatable along the channel 118 relative to the component housing 106 such that a user may selectively transition the first joint 140 between the usage and stowage positions. In some embodiments, the engagement of the mounting plate 146 with the tracks 148 in the channel 118 permit the first joint 140 to be slid along the channel 118. For example, the mating features of the mounting plate 146 may be configured to be slidable along the tracks 148 relative to the component housing 106. In some embodiments, the translation of the first joint 140 relative to the component housing 106 is restricted by the tracks 118. For example, when the mounting plate 146 is engaged with the tracks 118 the maximum distance with which the mounting plate 146 can slide along the tracks 148 is less than or equal to the height of the track 148. As such, the joint 140 may be slidable along the channel 118 by a distance equal to or less than the height of the tracks 148.

In some embodiments, the first joint 140 includes one or more locking features 150 configured to engage with the channel 118 and retain the position of the mounting plate 146 relative to the channel 118. The locking features 150 may be configured to transition between a locked state and an unlocked state in response to interaction from a user. In the locked state, the locking features 150 may engage with the channel 118 such that the first joint 140 is fixed in position relative to the component housing 106. In the unlocked state, the locking features 150 may be disengaged from the channel 118 such that a user may adjust the position of the first joint 140 relative to the component housing 106. In this manner, a user may position the first joint 140 in a desired position relative to the component housing 106 and selectively retain the first joint 140 in that position via the locking features 150. In some embodiments, the locking features 150 are configured to abut the base wall 130 of the channel 118 when in the locked state and retain the position of the first joint 140 thereon via friction. In other embodiments, the locking features 150 include a male or female mating feature configured to engage with at least one corresponding male or female mating feature of the channel 118 when in the locked state. For example, the locking features 150 may be indexing spring plungers having a selectively retractable indexing bolt configured to engage with corresponding indexed features in the channel 118. In some embodiments, the channel 118 includes a series of indexed mating features configured to engage with the locking features 150 when the first joint 140 is in one of a plurality of indexed positions. In some embodiments, a user may transition the first joint 140 between the use position and stowage position and lock the first joint 140 in said position via the locking features 150.

In some embodiments, when transitioning from the use position to the stowage position, the first joint 140 translates along the channel 118 towards the bottom surface 122 of the lighting apparatus 102. As illustrated in FIGS. 6A-6B, the first joint 140 is slid along the channel 118 towards the bottom surface 122. In some embodiments, a user may release the locking features 150 such that they disengage from the base wall 130 of the channel 118 and manually slide the first joint 140 downwards towards the bottom surface 122. The mating features of the mounting plate 146, may slide along the track(s) 148 of the channel 118 until the mounting plate 146 is not slidable any further along the tracks 148 towards the bottom surface 122. For example, the mounting plate 146 slides along the tracks 148 until the mating features abut a bottom terminal end of the tracks 148 as illustrated in FIG. 6C. In this position, the first joint 140 may be considered to be in the stowage position.

While the first joint 140 is in the stowage position, the mount arm 142 may be rotated relative to the first joint 140 such that the lighting assembly 100 may be easily stowed. In some embodiments, the mount arm 142 is rotated about the pivot axis P towards the top surface 122 as illustrated in FIG. 6C. As shown in FIG. 6C, the mount arm 142 is positioned substantially within the channel 118 while the first joint 140 is in the stowage position. This may enable the lighting apparatus 102 to be stowed while the mounting assembly 104 remains coupled thereto. In some embodiments, when the first joint 140 is in the stowage position the mounting assembly may be entirely contained within a volume of the lighting apparatus 102.

Figure 7A:
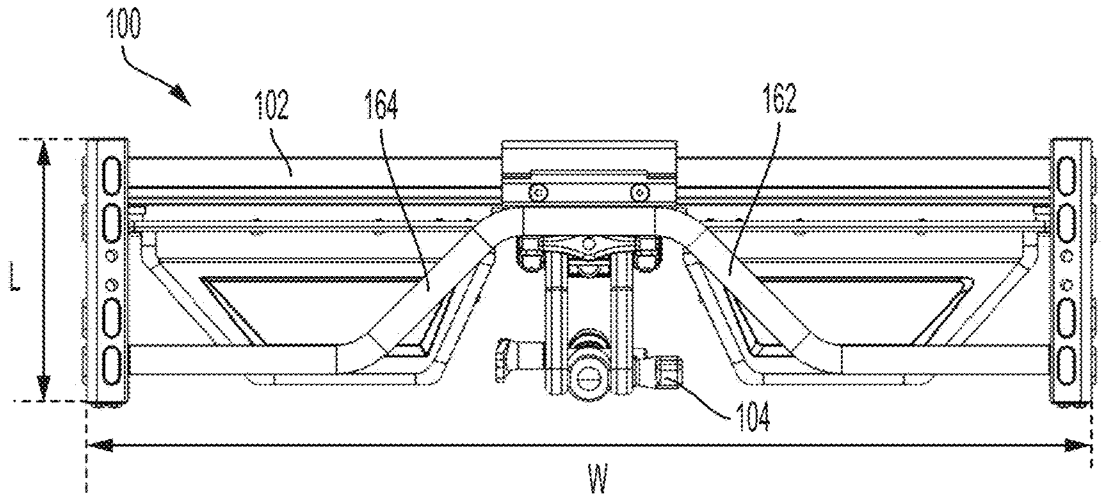
FIG. 7A is a top elevational view of the lighting assembly of FIG. 1 when in a stowage position.
Figure 7B:
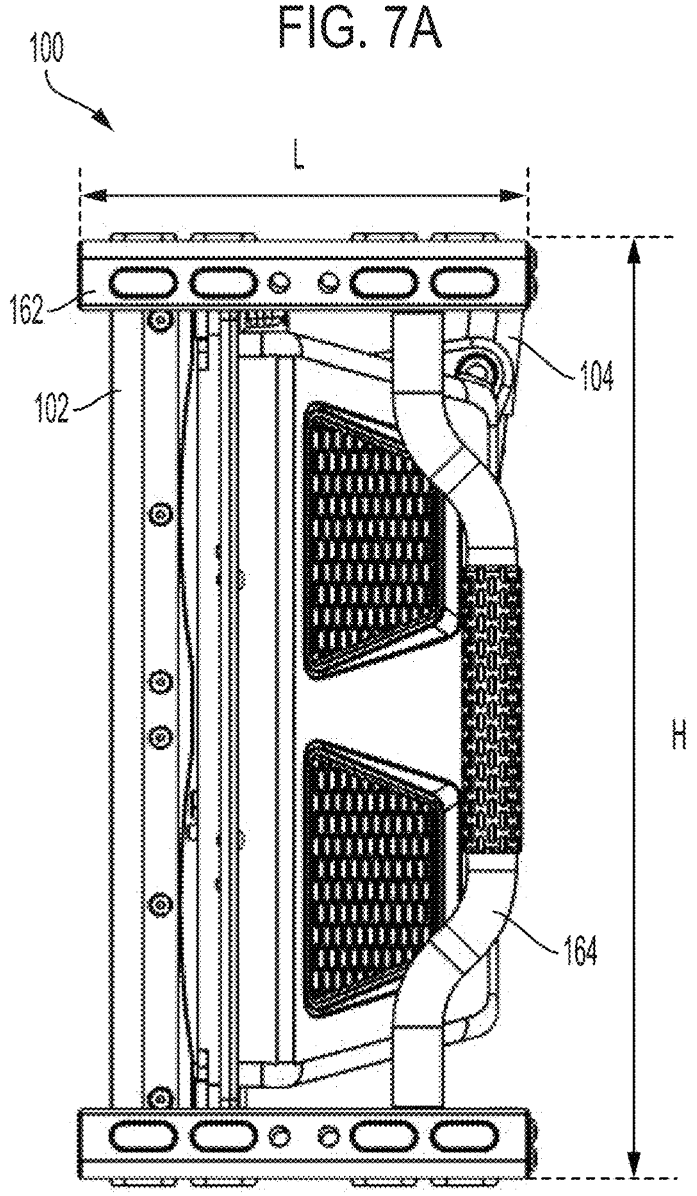
FIG. 7B is a side elevational view of the lighting assembly of FIG. 1 when in a stowage position.

Referring briefly to FIGS. 7A-7B, the volume of the lighting apparatus 102 may be defined by the maximum length L, width W, and height H thereof. While in the stowage position, the entirety of the mounting assembly 104 may be contained within said volume of the lighting apparatus 102. For example, when in the stowage position, the mounting assembly 104 may be entirely contained within an imaginary cuboid consisting of six planar surfaces as defined by the length L, width W and height H of the lighting apparatus 102. The mounting assembly 104 may not extend beyond or intersect any one of the said six imaginary planar surfaces of the imaginary cuboid formed in this manner. This may allow for easy stowage of the lighting assembly 100 without requiring that the mounting assembly 104 be decoupled therefrom. For example, multiple lighting assemblies 100 may be stacked one on top of another to be more easily stored and transported when compared to conventional lighting assemblies that require a mount to be decoupled therefrom.

Referring to FIGS. 5 and 6B, in some embodiments, the mounting assembly 104 is detachably coupled to the lighting apparatus 102. The first joint 140 may be detachably coupled to the component housing 106 to enable a user to decouple the mounting assembly 104 from the lighting apparatus 102 as desired. In some embodiments, the mounting plate 146 of the first joint 140 is detachable from the tracks 148 in the channel 118. For example, and as shown in FIG. 6B, the mounting plate 146 may be slid partially along the tracks 148 until it reaches a mouth 152 (shown in FIG. 5) in the tracks 148 sized to allow the mating features of the mounting plate 146 to pass therethrough. While the mating features of the mounting plate 146 are positioned within the mouth 152 of the tracks 148 the mounting assembly 104 may be translated away from the channel 118 such that the first joint 140 is decoupled from the component housing 106 as illustrated in FIG. 5.

Referring to FIG. 8, in some embodiments, the mounting assembly 104 is configured to allow for repositioning of the lighting apparatus 102 when in use. In some embodiments, the mount arm 142 of the mounting assembly 104 is configured to enable the lighting apparatus 102 to be rotated relative to a support 10 about two or more separate and distinct axes of rotation. In some embodiments, the lighting apparatus 102 is rotatable relative to the support about the pivot axis P defined by the first joint 140 as discussed above. For example, the lighting apparatus 102 may be rotated about the pivot axis P via the coupling of the mounting plate 146 and the component housing 106. As such, the component housing 106 may be rotated about the pivot axis P relative to the mount arm 142. In some embodiments, the component housing 106 is rotatable relative to the mount arm 142 only about the pivot axis P. For example, the cylindrical shape of the pivot shaft 144 restricts rotation of the component housing 106 relative to the mount arm 142 to only the pivot axis P.

In some embodiments, the mounting assembly 104 is configured to enable the lighting apparatus 102 to rotate relative to the support 10 about two or more axes of rotation spaced from the pivot axis P. For example, the mounting assembly 104 may include a support attachment pin 154 for coupling the mount arm 142 to the support 10 and a second joint 156 coupling the mount arm 142 to the support pin 154. The second joint 156 may be coupled to the support arm 142 opposite the first joint 140. For example, the first joint 140 may be coupled to a distal end 158 of the support arm 142 and the second joint 156 may be coupled to a proximal end 160 of the support arm 142. The support attachment pin 154 may extend along a longitudinal axis S that defines a first axis of rotation for the lighting apparatus 102. In some embodiments, the longitudinal axis S is generally perpendicular to the pivot axis P. The support attachment pin 154 may be rotatable relative to support 10 about the longitudinal axis S such that the lighting apparatus 102 may be rotated about the longitudinal axis S relative to the support 10. For example, while the lighting apparatus 102 is coupled to the mounting assembly 104, a user may rotate the lighting apparatus 102 and/or mounting assembly 104 about the longitudinal axis S relative to the support 10. In this manner, the lighting apparatus 102 may be rotatable about the longitudinal axis S relative to the support to enable for repositioning of the lighting apparatus 102 as desired. In other embodiments, the support attachment pin 154 may be configured to remain fixed in position relative to the desired support 10. For example, the support attachment pin 154 may include one or more keyed or indexing features configured to mate with corresponding features in the support 10 such that the support attachment pin 154 is not rotatable relative to the support 10 when coupled thereto. In still further embodiments, support attachment pin 154 may be rotatable with respect to support 10 about longitudinal axis S in a first state (e.g., an unlocked state) and fixed in position relative to support 10 in a second state (e.g., a locked state). In some embodiments, the attachment pin 154 is configured to be detachably coupled to the support 10. For example, the attachment pin 154 is detachable from the support 10 such that the lighting assembly 100 may be decoupled from the support 10.

In some embodiments, the second joint 156 may define a second axis of rotation for the lighting apparatus 102 relative to the support 10. The second joint 156 may define a second pivot axis P2 about which the lighting apparatus 102 is rotatable when coupled to the mounting assembly 104. The second pivot axis P2 may be perpendicular to the longitudinal axis S and/or parallel to the pivot axis P defined by the first joint 140. In some embodiments, the second pivot axis P2 is parallel to and spaced from the pivot axis P of the first joint 140. In some embodiments, the second pivot axis P2 is perpendicular to and intersects the longitudinal axis S. In other embodiments, the second pivot axis P2 is perpendicular to and spaced from the longitudinal axis S. In some embodiments, the second joint is a hinge.

The second pivot axis P2 may be defined by a corresponding pivot shaft (not shown) that is coupled to the mount arm 142. In some embodiments, the pivot shaft of the second joint 156 couples the mount arm 142 to the support attachment pin 154. In some embodiments, the second joint 156 is rotatably fixed to the support attachment pin 154 about the longitudinal axis S and rotatable relative to the pin 154 about the second pivot axis P2. In this manner, while coupled to the mounting assembly 104 the lighting apparatus 102 may be rotatable relative to the support 10 about three axes of rotation. For example, while coupled to the mounting assembly 104, the lighting apparatus 102 is rotatable relative to the pivot axis P defined by the first joint 140, the second pivot axis P2 defined by the second joint 156 and the longitudinal axis S defined by the support attachment pin 154. In this manner, while coupled to a support 10 via the mounting assembly 104, the lighting apparatus 102 may be positioned and/or oriented relative to the support 10 within a range of motion defined by the three axes of rotation discussed above. This may allow a user to direct the light emitted from the light sources 108 of the lighting apparatus as desired. In some embodiments, the mounting assembly 104 includes at least one releasable tightening and/or locking mechanism for each of the first joint 140, second joint 156 and support attachment pin 156. The tightening and/or locking mechanisms may be configured to enable a user to retain the position/orientation of the lighting apparatus relative to the support 10.

Figure 8A:
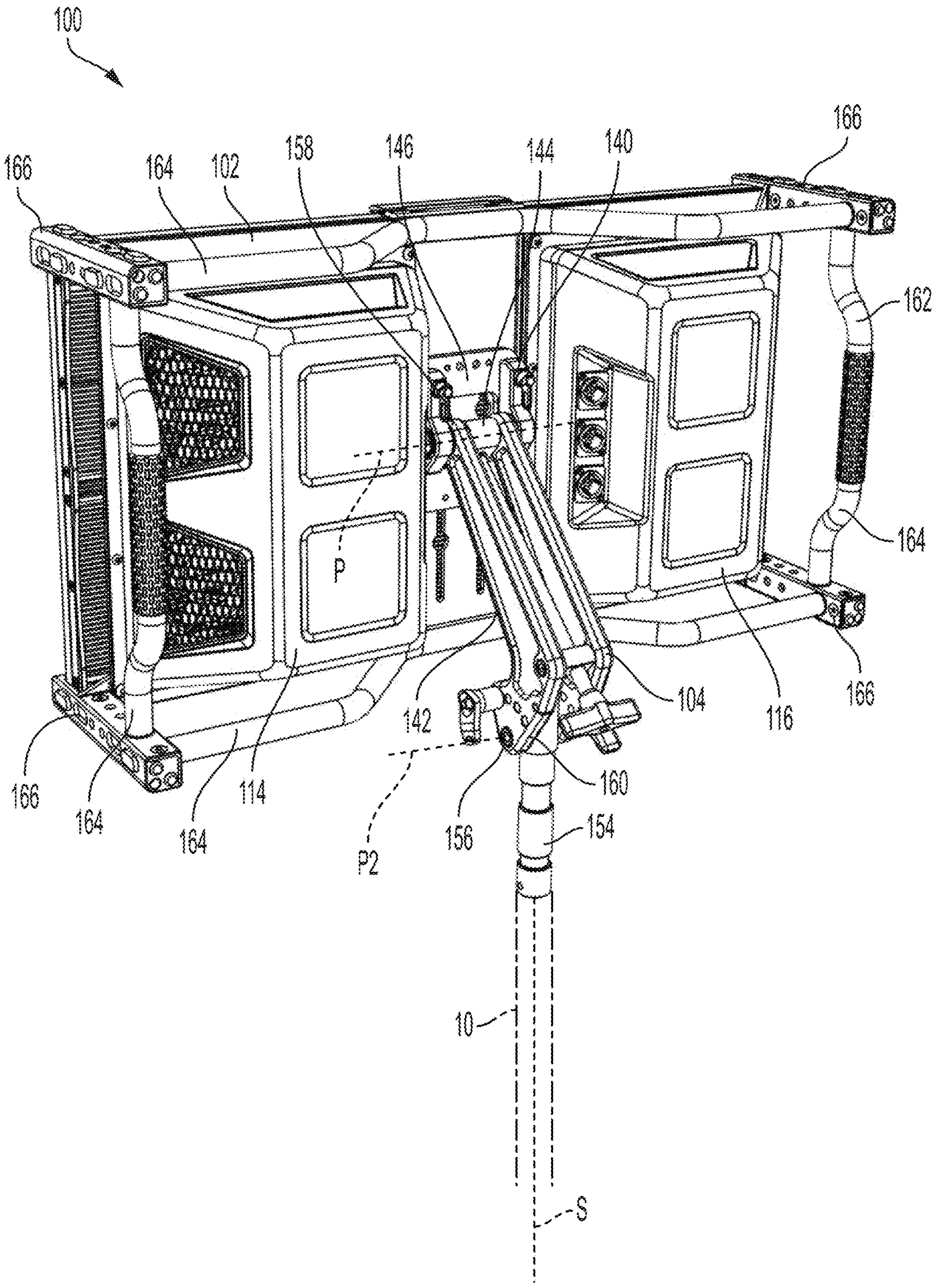
FIG. 8A is a rear perspective view of the lighting assembly of FIG. 1.
Figure 8B:
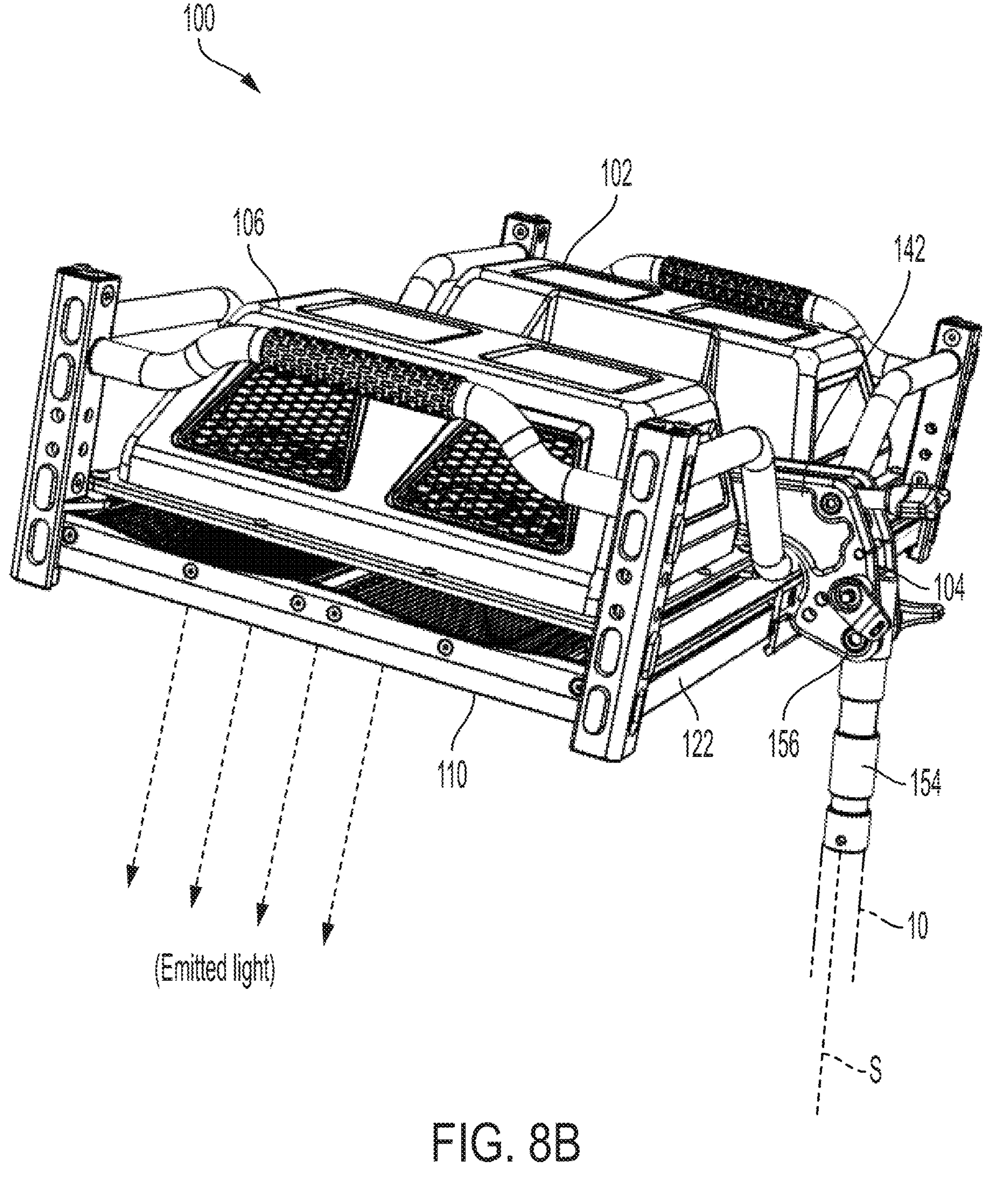
FIG. 8B is a rear side view of the lighting assembly of FIG. 1 with the light panel oriented such that light may be emitted from the light panel in a direction that is generally parallel to the support attachment pin.

Referring to FIGS. 8A-8B, in some embodiments, the mounting assembly 104 is configured to enable light emitted via the lighting apparatus 102 to be oriented generally parallel to a support 10 coupled thereto. The mount arm 142 may be sized and/or shaped to facilitate positioning of the light sources 108 coupled to the front side 110 of the lighting apparatus generally perpendicular to the support attachment pin 154. As illustrated in FIG. 8B, the mount arm 142 may be curved such that the lighting apparatus 102 is rotatable about the pivot axis P to a position in which beams of light (illustrated as the dash-dash arrow lines) are generally parallel to the longitudinal axis S defined by the support attachment pin 154. For example, the component housing 106 is rotated from the position illustrated in FIG. 8A about the pivot axis P such that the bottom surface 122 of lighting apparatus 102 is received within the curved portion of the mount arm 142. In some embodiments, the lighting apparatus 102 is rotatable about the pivot axis P such that it abuts the mount arm 142. Continuing from the preceding example, the mount arm 142 is rotated relative to the support attachment pin 154 via the second hinge 156 until the front side 110 of lighting apparatus 102 is generally perpendicular to the longitudinal axis S. In the position illustrated in FIG. 8B, the light sources 108 (e.g., light panels) are perpendicular to the longitudinal axis S and the light emitted therefrom being generally parallel to the longitudinal axis S. In some embodiments, light is emitted from light panel 102 in a direction that is normal to a plane of front side 110. In some embodiments, the mount arm 142 is shaped and/or sized to enable the light source 102 to be positioned relative to the support attachment pin 154 such that light emitted from the light panel 102 is oriented within about 10 degrees of the longitudinal axis S.

Referring to FIGS. 7A-8A, in some embodiments, the lighting apparatus 102 includes a frame 162 configured to aid in repositioning and/or transport of the lighting assembly 100. In some embodiments, the frame 162 is coupled to the component housing 106 along a perimeter thereof and defines the maximum length L, width W, and height H of the lighting apparatus 102. For example, the frame 162 may be coupled to the component housing 106 and extend at least partially around a perimeter thereof. In some embodiments, the frame 162 is exterior to the first and second compartments 114, 116 of the component housing 106. For example, the first and second compartments 114, 116 may be positioned along the component housing 106 such that they are interior to and spaced from the frame 162. In some embodiments, the frame 162 is fixedly coupled to the component housing 106. The frame 162 may include a plurality of support beams 164 coupled to one another and positioned external to the component housing 106. In some embodiments, the support beams 164 of the frame 162 are positioned, shaped and/or sized to enable a user to easily grasp the support beams 164 when repositioning the lighting apparatus relative to the support 10. For example, the support beams 164 may have a generally circular cross-section and are spaced from the component housing 106 such that a user can easily grasp one or more of the support beams 164 without being obstructed by the component housing 106. As such, a user may grip the frame 162 and apply a force thereto to cause the position of the lighting apparatus 102 to be adjusted relative to the support 10. When decoupled from the support 10, a user may grab the support beams 164 of the frame 162 to carry the lighting assembly 100 to a desired location. As shown in the illustrated examples, in some embodiments the support beams 164 of frame 162 need not be straight along their entire lengths, but may include curved or bent portions. For example, portions of frame 162 may be curved or bent towards front side 110 to provide clearance for components extending through the ends of channel 118 at the top and bottom surfaces 120, 122. In some embodiments, portions of frame 162 may be curved or bent away from front side 110 to define handles for a user to manipulate lighting apparatus 102. In some embodiments, frame 162 may have mirror symmetry about one or two planes. These planes of symmetry may each intersect with the center of gravity (COG) of the lighting apparatus 102 according to some embodiments.

The frame 162 may further be configured to aid in storage of the lighting assembly 100. The frame 162 may include one or more connecting members 166 configured to detachably couple to the corresponding connecting members of a second lighting assembly 100. The connecting members 166 may be fixedly coupled to the component housing 106 and be positioned at the corners thereof. In some embodiments, the connecting members 166 protrude outwardly from the top, bottom, and side surfaces of the component housing 106 such that they define the outermost perimeter of the lighting apparatus 102. Each connecting member 166 may include a series of male and female mating features configured to engage with the male and female mating features of a connecting member of the frame 162 of another lighting apparatus 102. For example, two lighting assemblies 100 each being substantially the same as one another may be coupled together via engagement of the mating features of the corresponding connecting members 166. In this manner, multiple lighting assemblies 100 may be connected to one another to form an array of lighting assemblies 100 and/or for ease of storage.

Figure 9:
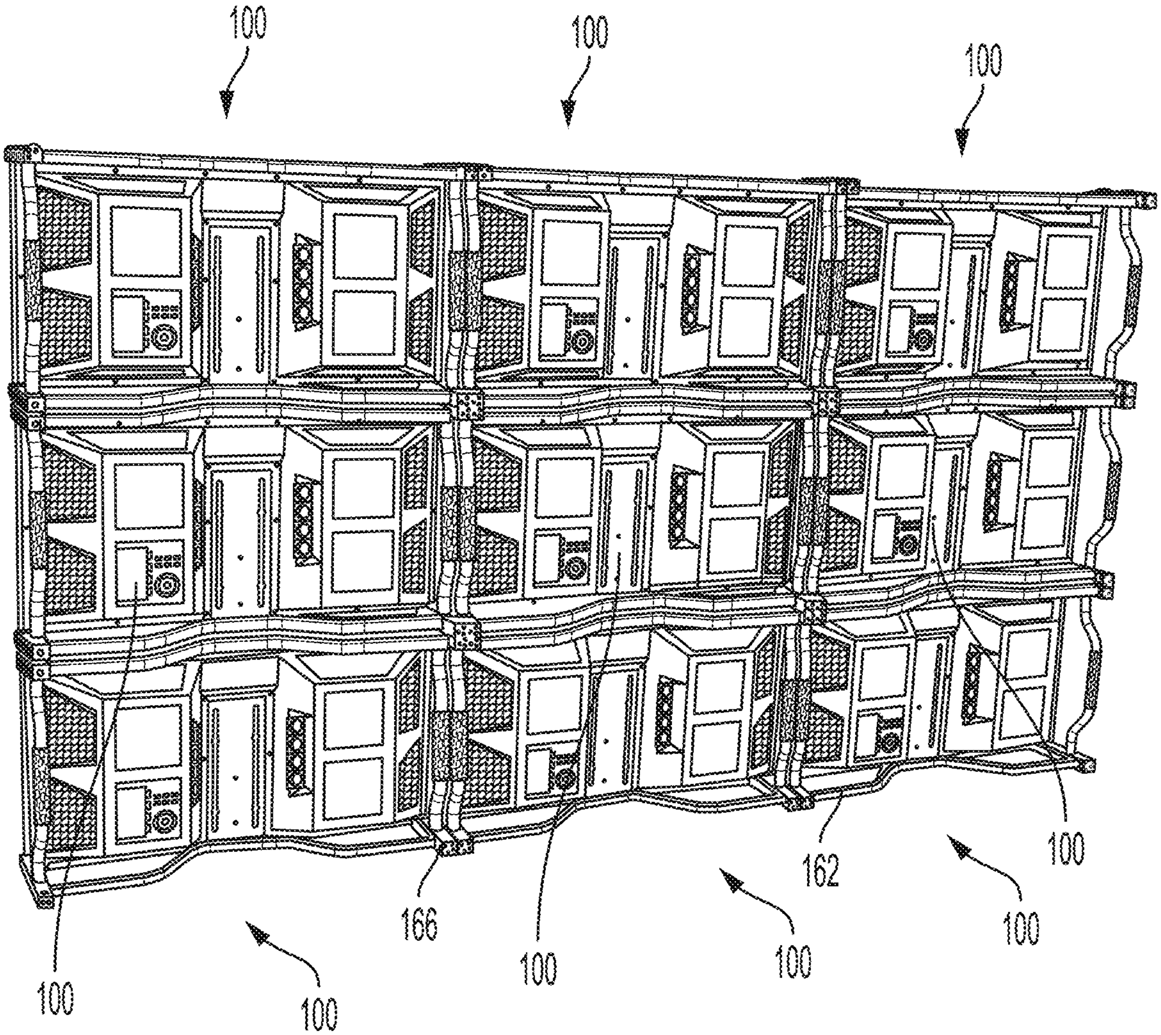
FIG. 9 illustrates a plurality of lighting assemblies as shown in FIG. 1 connected to one another to form a wall of lighting assemblies.
Figure 10:
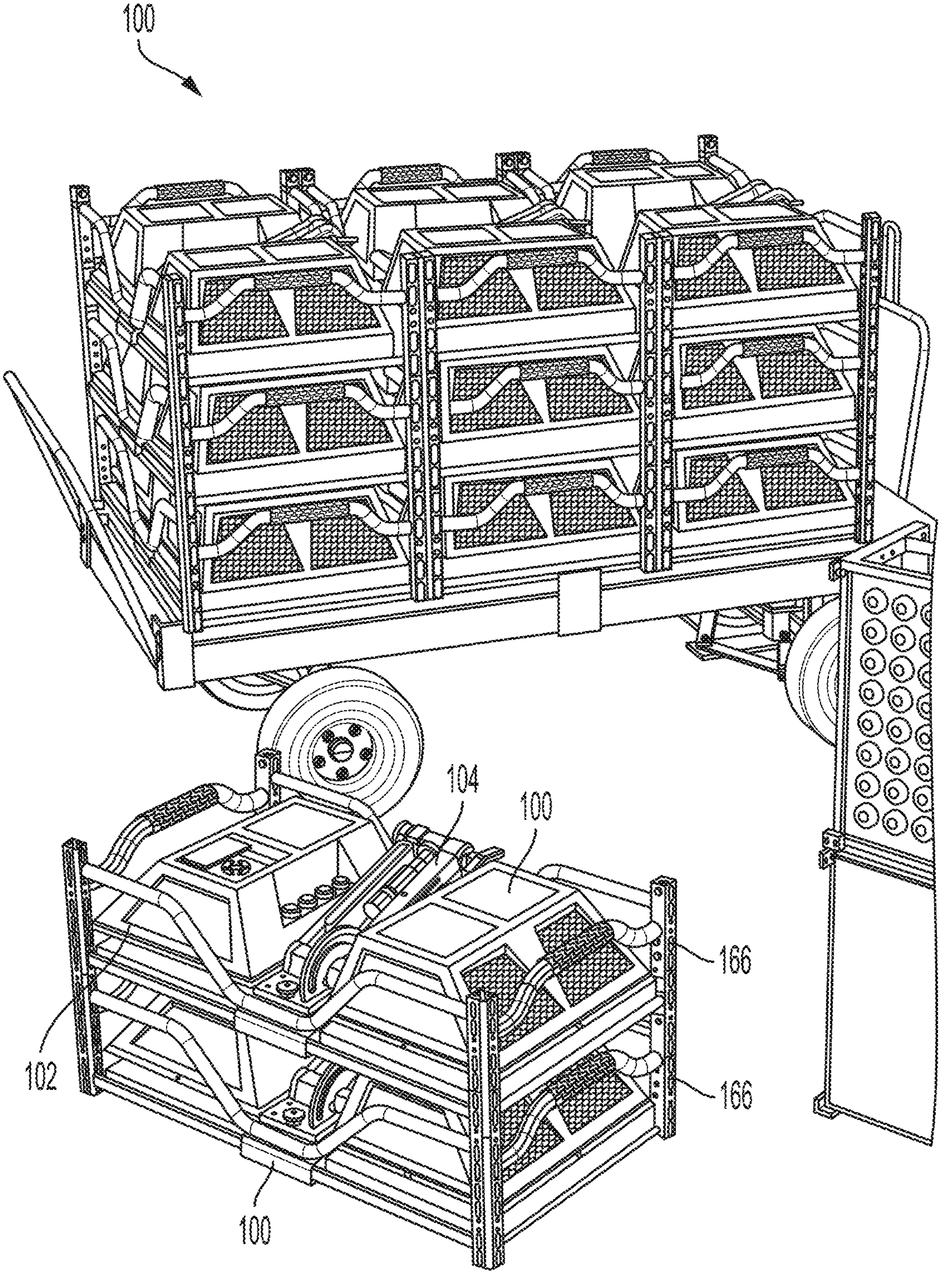
FIG. 10 illustrates a plurality of lighting assemblies as shown in FIG. 1 stacked one on top of another for storage.

For example, and referring to FIGS. 9-10, there is shown a plurality of lighting assemblies 100 coupled to one another via the connecting members 166 of the respective frames 162. In FIG. 9, there are nine lighting assemblies 100 each connected to one another via the frames 162 and arranged in a 3×3 array. In this example, each lighting assembly 100 is connected to each adjacent lighting assembly 100 via the connecting members 166 of the respective frames 162. Further to this example, the light sources 108 (not shown) of each lighting assembly 100 may be generally planar with one another such that they form a generally continuous wall of light sources providing a greater range of illumination than a single lighting assembly 100. It should be understood that any number of lighting assemblies 100 may be connected to one another in generally the same manner as desired. Still referring to the example in FIG. 9, the mounting assembly 104 of each lighting assembly 100 has been decoupled therefrom and the frames 162 of the bottom most lighting assemblies 100 form a base which is placed on a ground surface. As such, the frames 162 of the bottom three lighting assemblies 100 act as a stand preventing the array of lighting assemblies from tilting over. However, it should be understood that based on the number and/or arrangement of the lighting assemblies 100, one or more additional support devices and/or structures may be connected to the lighting assemblies 100 to prevent accidental or unintended tilting thereof.

In FIG. 10, the lighting assemblies 100 are shown stacked one on top of another for the purposes of transport and/or storage. The lighting assemblies 100 are stacked such that the front surface of one lighting assembly 100 is above and faces the rear surface of the lighting assembly 100 below it. In this example, the connecting members 166 of each lighting assembly 100 are engaged with one another to prevent accidental or unintended sliding or dislodgement of one lighting assembly 100 from another. Further to this example, and as depicted in FIG. 10, the mounting assemblies 104 of each lighting assembly 100 are in the stowage position while the lighting assemblies are stacked one on top of another. As discussed above, the mounting assemblies 104, when in the stowage position, do not extend beyond the volume of the corresponding lighting assembly 100. As such that the lighting assemblies 100 may be stowed without requiring the mounting assemblies 104 to be decoupled therefrom. This may reduce the time and/or space required to stow each lighting assembly 100 when compared to removing and storing the mounting assemblies 104 separate from the respective lighting apparatus 102.

Figure 11:
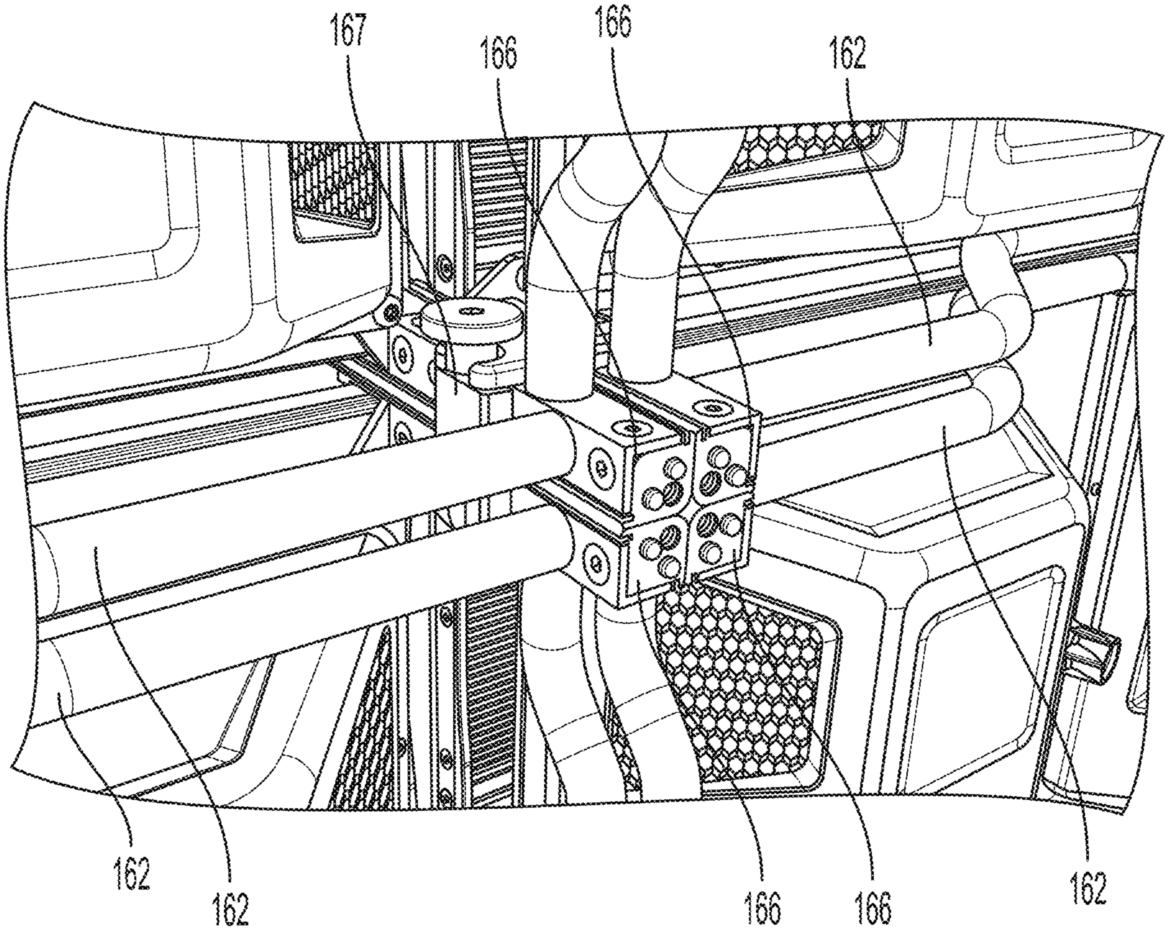
FIG. 11 is a magnified view of a plurality of light assemblies connected to one another to form a wall using a clamp in accordance with an embodiment of the present disclosure.
Figure 12A:
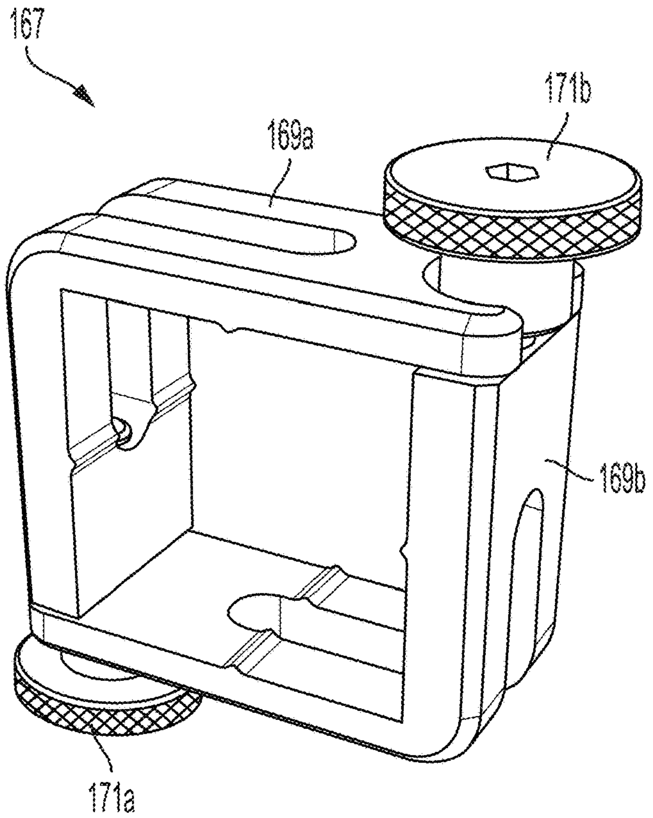
FIGS. 12A-12B are perspective vies of the clamp of FIG. 11 in a locked and unlocked configuration.
Figure 12B:
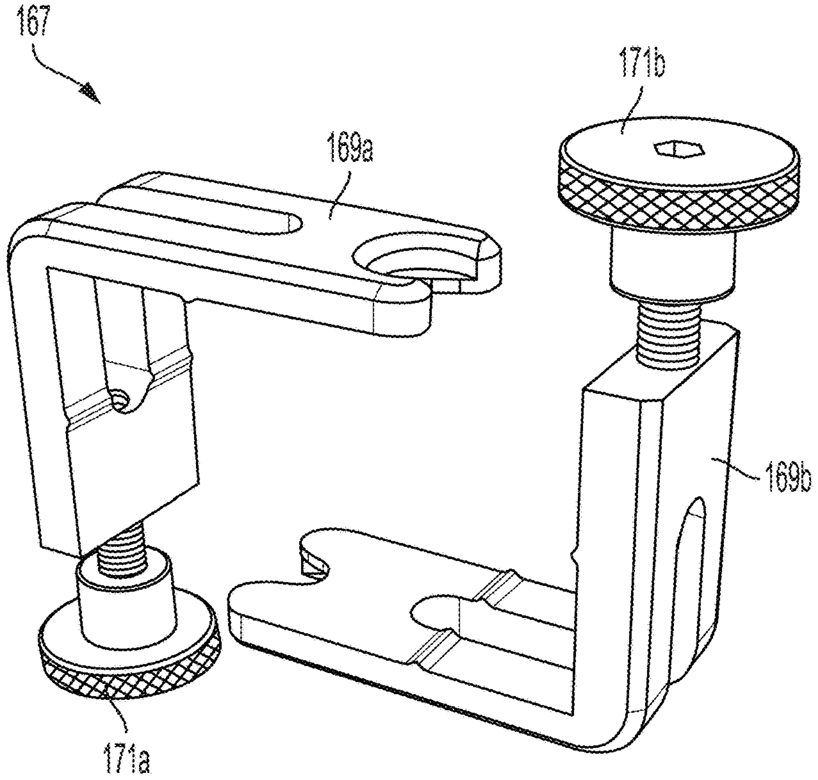
Figure 13:
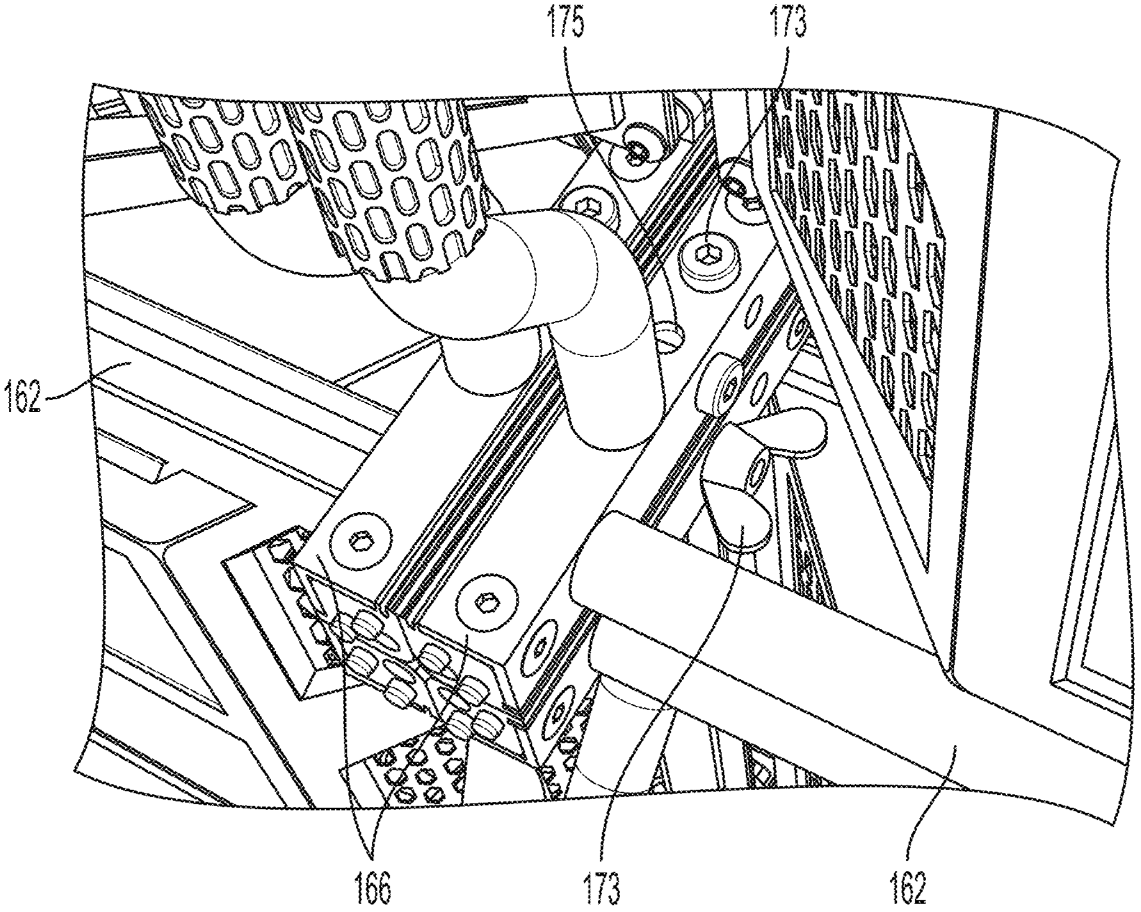
FIG. 13 is a magnified view plurality of light assemblies connected to one another to form a wall using fasteners in accordance with an embodiment of the present disclosure.

Referring to FIGS. 11-13, the frames 162 may be configured to receive one or more fastening members for securing the attachment of the frames 162 to one another. In one embodiment the frames 162 are configured to receive a clamp 167 for coupling a plurality of frames 162 to one another. The clamp 167 may be sized to engage with a plurality of connecting members 166 to securely fasten the frames 162 to one another. For example, two or more connecting members 166 that are coupled to one another may be received by the clamp 167 to prevent the accidental or unintended decoupling of the connecting members 166 from one another. In some embodiments, the clamp 167 is sized and/or shaped to receive at least two connecting members 166. In some embodiments, the clamp 167 is sized and or shaped to receive at least four connecting members 166. For example, and as illustrated in FIG. 11, the clamp 167 surrounds and abuts the connecting members 166 of four separate frames 162 arranged in a 2×2 array thereby preventing the connecting members 166 from decoupling from one another. In other embodiments, the clamp 167 is sized to receive two adjacent connecting members 166.

The clamp 167 may be configured to be selectively coupled to and decoupled from the frame(s) 162. For example, and as illustrated in FIGS. 12A-12B, the clamp 167 may include two jaws 169*a*-169*b* detachably coupled to one another by respective threaded clamping knobs 171*a*-171*b*. The jaws 169*a*, 169*b* may be substantially the same as one another. For example, both jaws 169*a*-169*b* may be the same size and/or shape as one another. In some embodiments, each of the jaws 169*a*, 169*b* is generally L-shaped corresponding to the shape of the connecting members 166. In other embodiments, the jaws 169*a*, 169*b* may be any desired shape and/or size such that they may extend around and abut the connecting members 166. The threaded clamping knobs 171*a* may enable the clamp 167 to be retained in a locked configuration (e.g., as shown in FIG. 11 and FIG. 12A) or an unlocked configuration (e.g., as shown in FIG. 12B). In the locked configuration, the clamp 167 is configured to retain the connecting members 166 therein and in the unlocked configuration the clamp 167 may be coupled to or decoupled from the connecting members 166. The clamp 167 may be configured to enable a user to easily and securely retain the connection of multiple frames 162 to one another while also providing for quick and easy decoupling of frames 162. For example, in the unlocked configuration, a user can place the jaws 169*a*, 169*b* onto the four connecting members 166 as illustrated in FIG. 11 and securely clamp the jaws 169*a*, 169*b* thereto via the threaded clamping knobs 171*a*-171*b*.

In some embodiments, the frame 162 is configured to receive fasteners 173 for coupling the frame 162 to an adjacent frame. For example, and as illustrated in FIG. 13, the connecting members 166 of each frame 162 include apertures 175 for receiving fasteners 173. The apertures 175 may be located along the respective connecting members 166 such that when the connecting members 166 are properly coupled to one another, the apertures 175 of one connecting member 166 lines up with the apertures 175 of the adjacent connecting member 166. In this manner, a fastener 173 can pass through the apertures of two adjacent connecting members 166 to securely fasten the frames 162 to one another. The fasteners 173 in this example are threaded bolts and corresponding wing nuts, however other fastening means known to those skilled in the art may be used.

Figure 14:
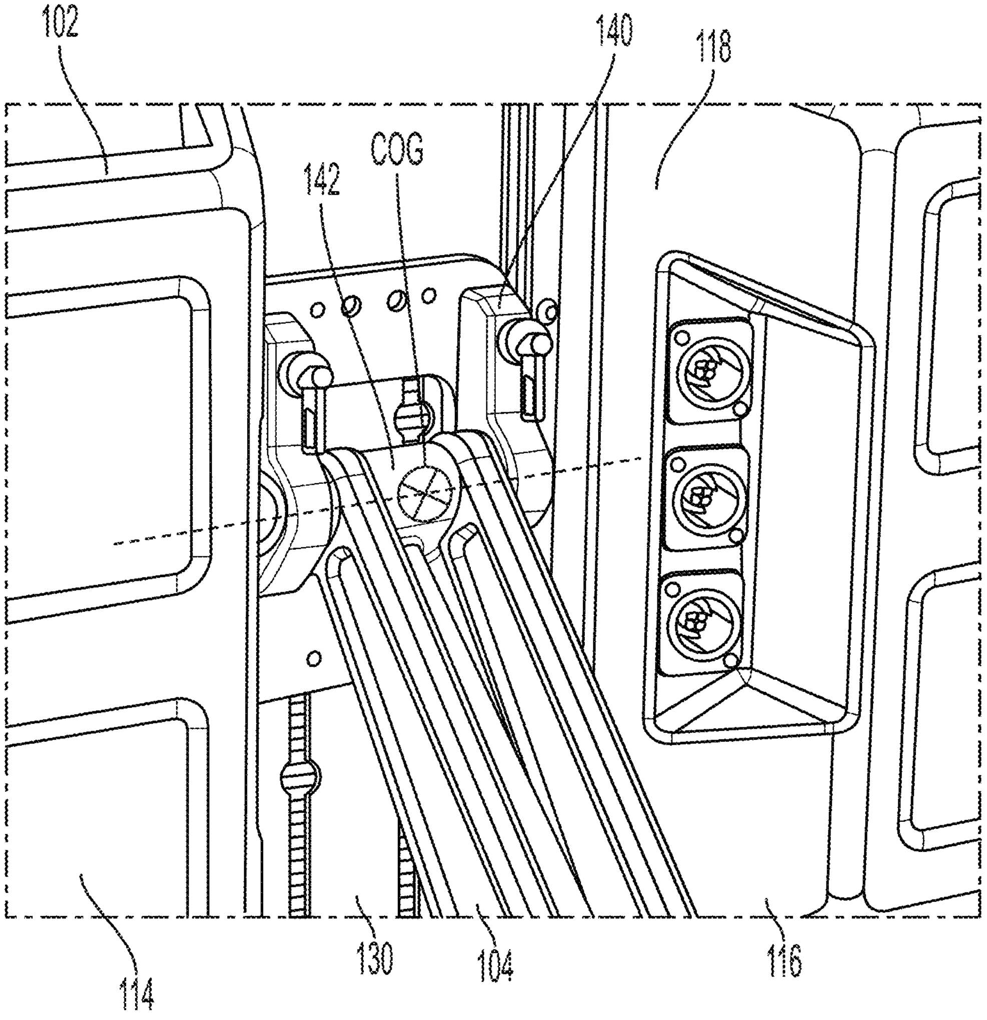
FIG. 14 is a partial, enlarged rear perspective view of the lighting assembly of FIG. 1 while the first joint thereof is in a use position.

Referring to FIG. 14, the mounting assembly 104 may be configured to be coupled to the lighting apparatus 102 such that a portion of the mounting assembly 104 intersects the center of gravity (COG) of the lighting apparatus 102. The COG of the lighting apparatus 102 may be located within the channel 118 of the component housing 106 and exterior to the base wall 130 of the channel 118. In some embodiments, the COG of the lighting apparatus 102 may be located between the first and second compartments 114, 116, equidistant from both, and within the channel 118 such that it is spaced from the outer surface of the component housing 106. For example, the COG may be located in the space between the first and second compartments 114, 116 and be external to the component housing 106. In some embodiments, the COG of lighting apparatus 102 may be located at the center of geometry (the geometric center) of lighting apparatus 102. In some embodiments, the COG of the lighting apparatus 102 is different than and is offset from the center of geometry of the lighting apparatus 102. For example, the COG of the lighting apparatus 102 may be located a point in space that is different from where the center of geometry is located.

In some embodiments, when the first joint 140 is in the use position the pivot axis P extends through the COG of the lighting apparatus 102. For example, and as illustrated in FIG. 9, when the first joint 140 is in the use position, the COG lies on the pivot axis P defined by the pivot shaft 142. In some embodiments, the first joint 140 passes through the COG of the lighting apparatus 102 when in the use position. For example, when in the use position, the pivot shaft 142 intersects the COG. In some embodiments, the pivot shaft 142 is configured to be centered on the COG of the lighting apparatus 102 when the first joint 140 is in the use position. For example, when in the use position, the geometric center of the pivot shaft 142 is located at the same point in space as the COG of the lighting apparatus 102. By positioning the pivot axis P at the COG of the lighting apparatus 102, it may be more easily rotated about the pivot axis P when compared to a pivot axis offset from the COG. Furthermore, by positioning the pivot shaft 142 at the COG of the lighting apparatus 102 when in the use position, it may be easier for a user to rotate the lighting apparatus 102 about the pivot axis P when compared to conventional mounting assemblies. In some embodiments, and as discussed above, by positioning the first joint 140 at the COG when in the use position, a user may more easily interact with the lighting apparatus 102 (e.g., repositioning, accessing control panel 138) when compared to conventional mounting assemblies for lighting equipment.

In some embodiments, positioning the first joint 140 at the COG when in the use position increases the safety of operating the lighting assembly 100 when compared to conventional mounting structures. For example, as opposed to conventional mounting structures, the lighting assembly 100 includes the mounting assembly 104 having a first joint 140 located at the COG and interior to the outer perimeter of the lighting apparatus 102. This may eliminate or at least substantially reduce any potential pinch points at the perimeter of the lighting apparatus 102 where a user is apt to place their hands when positioning the lighting apparatus 102. Furthermore, by positioning the first joint 140 at the COG and interior to the outer perimeter of the lighting apparatus the visual obstructions at both the front and rear sides 110, 112 of the lighting assembly 100 is reduced when compared to conventional assemblies. This may enable users to position, operate and/or control the lighting assembly 100 substantially without visual obstruction.

In some embodiments, the pivot axis P is offset from the COG when the first joint 140 is in the stowage position (shown in FIG. 6C). For example, when transitioning from the use position to the stowage position, the first joint 140 slides down the channel 118, as discussed above, such that the pivot axis P translates relative to the component housing 106 away from the COG.

Figure 15:
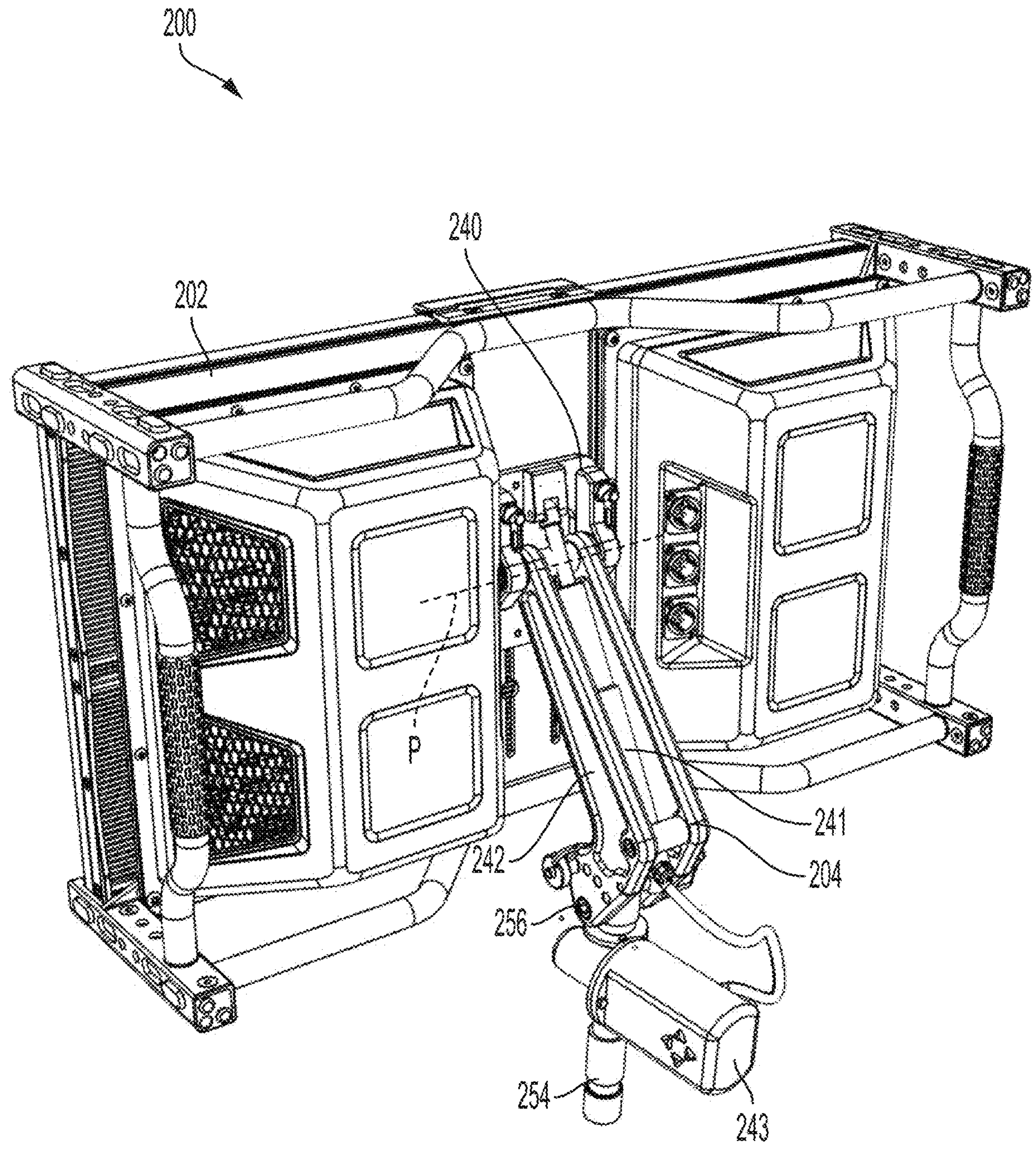
FIG. 15 is a rear perspective view of a lighting assembly in accordance with another exemplary embodiment of the present disclosure.

Referring to FIG. 15, there is shown a lighting assembly, generally designated 200, in accordance with another exemplary embodiment of the present invention. The lighting assembly 200 may be generally the same as the lighting assembly 100 except that it may include a powered mounting assembly 204. The mounting assembly 204 may be coupled to a lighting apparatus 202 that is substantially the same as the lighting apparatus 102. In some embodiments, the mounting assembly 204 is coupled to the lighting apparatus 202 in generally the same manner as the mounting assembly 104 is coupled to the lighting apparatus 102 as discussed above. The mounting assembly 204 may define generally the same axes of rotation for the lighting apparatus 202 as the mounting assembly 104. For example, the mounting assembly 204 includes a first joint 240, second joint 256 and support attachment pin 254 each being generally the same as the first joint 140, second joint 156 and support attachment pin 154 discussed above.

The mounting assembly 204 may be generally the same as the mounting assembly 104 except that it may include one or more actuators 241 configured to effect translation of the lighting apparatus 202 relative to the support attachment pin 254. In some embodiments, there is an actuator 241 coupled to the mount arm 242 and engaged with the first joint 240. In some embodiments, the actuator 241 is configured to effect rotation of the first joint 240 relative to the mount arm 242 about the pivot axis P. For example, the actuator 241 may be configured to apply a force on the first joint 240 at a location offset from the pivot axis P such that the first joint 240 rotates about the pivot axis P in response to the force applied by the actuator 241. In some embodiments, the actuator 241 is a pneumatic or hydraulic actuator configured to generate linear motion. In some embodiments, the actuator 241 is a linear electric actuator having a tilt range of at least 120°. For example, the actuator 241 may be configured to cause the lighting apparatus 202 to pivot about the pivot axis P by at least 120°. In some embodiments the actuator includes a powered pan mechanism configured to cause the mount arm 242 to rotate relative to the support attachment pin 254. For example, the actuator 241 may include an electric stepper motor with worm gear transmission that is configured to cause the mount arm 242 and first joint 240 to rotate about the support attachment pin 254 by at least 180° either clockwise and/or counterclockwise. In some embodiments, the actuator 241 is a powered actuator communicatively coupled to a control device 243 that is configured to control the operation of the actuator 241. The control device 243 may be coupled to the support attachment pin 254 such that a user may easily access the control device 243 without other elements of the lighting assembly 200 obstructing the control device 243.

Figure 16:
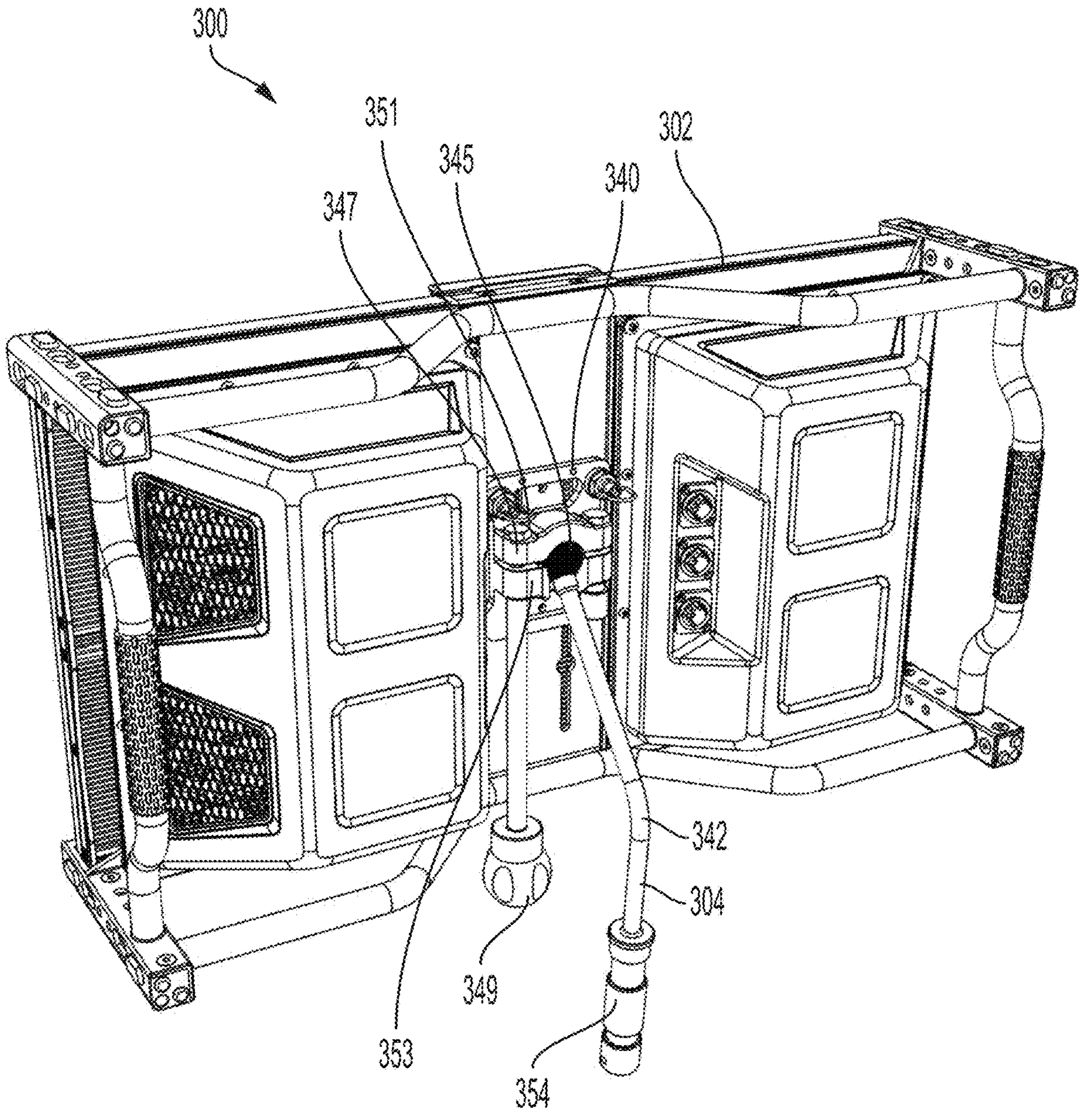
FIG. 16 is a rear perspective view of a lighting assembly in accordance with another exemplary embodiment of the present disclosure.

Referring to FIG. 16, there is shown a lighting assembly, generally designated 300, in accordance with another exemplary embodiment of the present invention. The lighting assembly 300 may be generally the same as the lighting assembly 100 except that it may include a ball joint. For example, the first joint 340 may be a ball joint including a ball 345 received within a socket 347. In some embodiments, the first joint 340 allows for the lighting apparatus 302 to be rotated relative to the ball 345 about cartesian axes having an original point at the geometric center of the ball 345. In some embodiments, the ball 345 is centered on the center of gravity of the lighting apparatus 302 when in the use position (as shown in FIG. 16). For example, the center point of the ball 345 and the center of gravity of the lighting apparatus 302 may be located at the same point in space when the first joint 340 is in the use position. The mounting assembly 304 may further include a mount arm 342 coupled to a support attachment pin 354. The mount arm 342 may couple the ball 345 to the support attachment pin 354. For example, the mount arm 342 may be fixedly coupled to the ball 345 at one end and fixedly coupled to the support attachment pin 354 at the opposite end.

In some embodiments, the mounting assembly 304 differs from the mounting assembly 104 in that it does not include a second joint 156. By providing a ball joint 340 allowing for three axes of rotation for the lighting apparatus 302, the lighting assembly 300 may be configured for use cases in which rapid adjustments to the orientation of the lighting apparatus 302 are desired. For example, the ball joint 340 provides a user with the ability to more rapidly reorient (e.g., transitioning between portrait and landscape orientations) the lighting apparatus 302 relative to the mounting assembly 304 as compared to the lighting apparatus 100. In some embodiments though, the mount arm 342 is coupled to the support attachment pin 354 by a second joint that is substantially the same as the second joint 156. In some embodiments, the first joint 340 further includes a handle 349 fixedly coupled thereto and configured to enable a user to orient the lighting apparatus 302. The handle 349 may be fixedly coupled to the socket 347 and extend outwardly therefrom.

In some embodiments, the handle 349 is configured to adjust a clamping force exerted on the ball 345 by the socket

347. The socket 347 may include a fixed jaw 351 and an adjustable jaw 353 that form a clamp retaining the ball 345 therein. The handle 349 may be coupled to the jaws 351, 353 and configured to adjust the position of the adjustable jaw 353 relative to the fixed jaw 351. For example, rotation of the handle 349 in a first direction (e.g., clockwise rotation) causes the adjustable jaw 353 to move towards the fixed jaw 351 whereas rotation of the handle in a second direction (e.g., counterclockwise rotation) causes the adjustable jaw 353 to move away from the fixed jaw 351. Accordingly, the handle 349 may be operable to adjust the tightness of the ball 345 within the socket 347 and the force needed to move the socket 347 relative to the ball 345 (e.g., the force needed to operate the ball joint 340 formed by the socket 347 and ball 345).

Figure 17A:
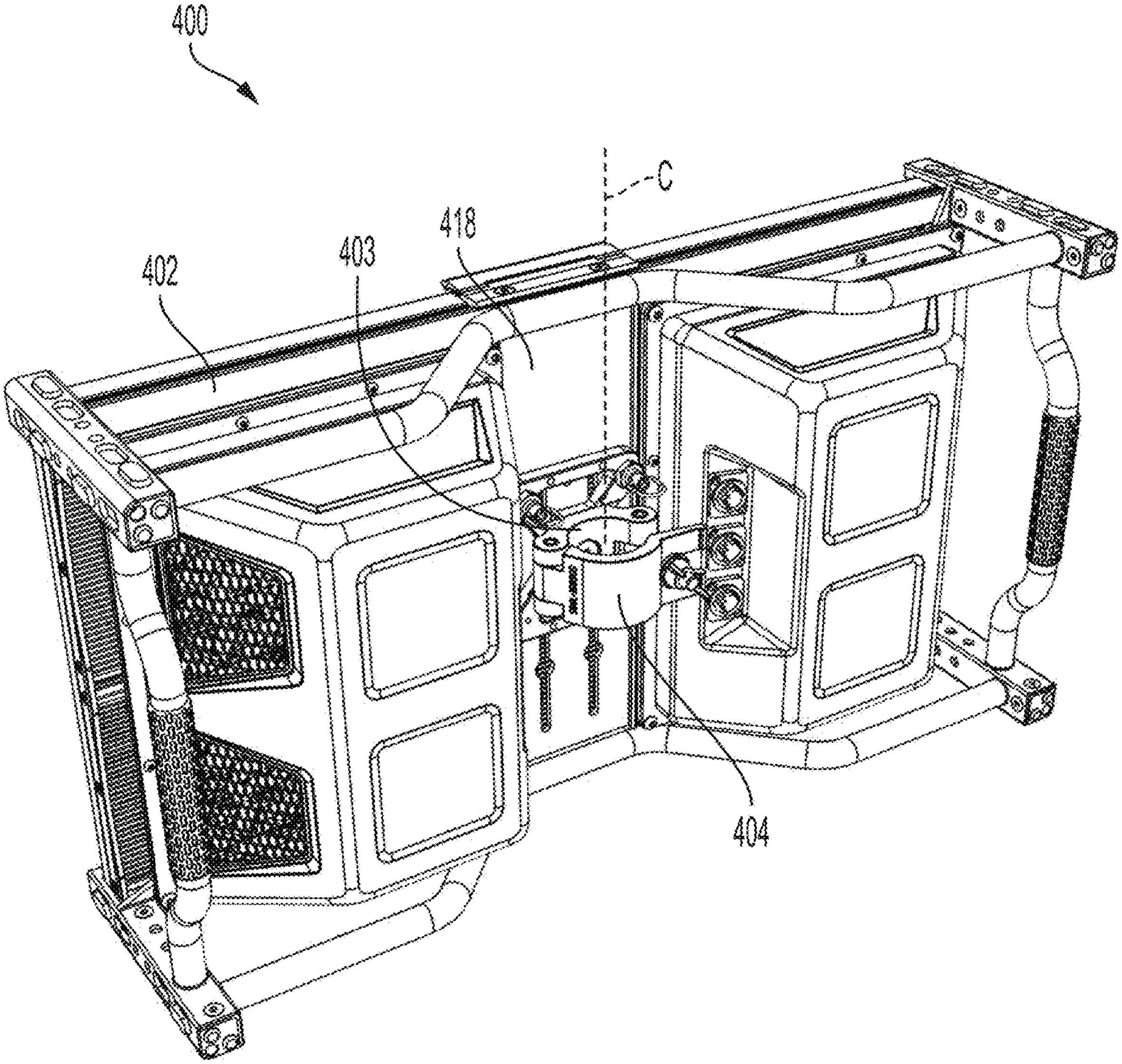
FIG. 17A is a rear perspective view of a lighting assembly in accordance with another exemplary embodiment of the present disclosure.
Figure 17B:
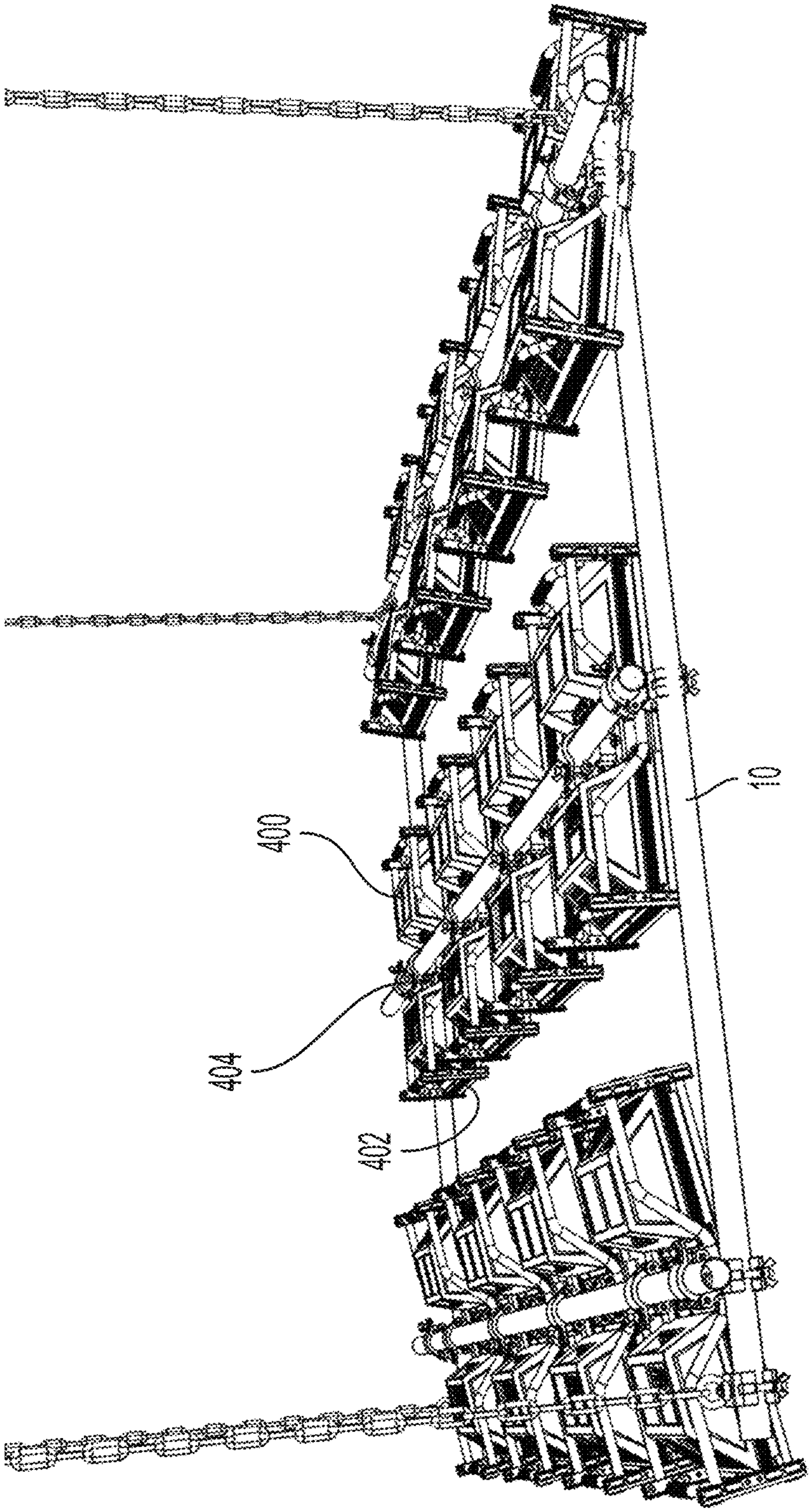
FIG. 17B illustrates a plurality of the lighting assemblies of FIG. 17A coupled to a support structure.

Referring to FIGS. 17A-17B, there is shown a lighting assembly, generally designated 400, in accordance with another exemplary embodiment of the present invention. The lighting assembly 400 may be generally the same as the lighting assembly 100 except that the mounting assembly 404 may be a clamp. The mounting assembly 404 may be slidably coupled to the lighting apparatus 402 via the channel 418 of the component housing 406 in generally the same manner as discussed above with regards to the lighting assembly 100. For example, the mounting assembly 404 may be configured to translate along the channel 118 between one or more positions.

In some embodiments the mounting assembly 404 is a clamp including an inner surface 403 configured to mount the lighting assembly 400 to a support 10. In some embodiments, for example, clamp 404 may be a circular clamp sized and shaped to clamp around cylindrical tubes or rods that may form support 10. The inner surface 403 may be shaped and sized such that it may be clamped onto the support 10. As illustrated in FIG. 17B, the support 10 is a hanging rack comprising a plurality of tubes to which a plurality of lighting assemblies 400 are coupled to. The inner surface 403 of the clamp extends generally circumferentially about a central axis C and has a radius that is greater than or equal to the outer radius of the tubes of the support 10. In some embodiments, the central axis C is offset from the center of gravity of the lighting apparatus 402. In some embodiments, the central axis C is offset from the center of gravity of the lighting apparatus by about 10 mm or less. The inner surface 403 may abut the tubes of the support 10 thereby mounting the lighting assembly 400 to the support 10. The mounting assembly 404 may be configured to enable the lighting assembly 400 to be positioned and/or rotated about the central axis C relative to the support 10 to a desired orientation. For example, and as illustrated in FIG. 17B, a plurality of lighting assemblies 400 are positioned along the length of each of the three transverse tubes of the support 10. Further to this example, the lighting assemblies 400 mounted to the left most and right most tubes of the support 10 have been rotated relative to the support 10 about the central axis C to a desired orientation. By providing the mounting assembly 404, the lighting assembly 400 may be used in situations in which it is desired to focus illumination from a plurality of light sources at a desired area. For example, in FIG. 17B the lighting assemblies 400 are oriented such that the light emitted from each is generally focused in the same location rather than each emitting parallel light beams.

Figure 18:
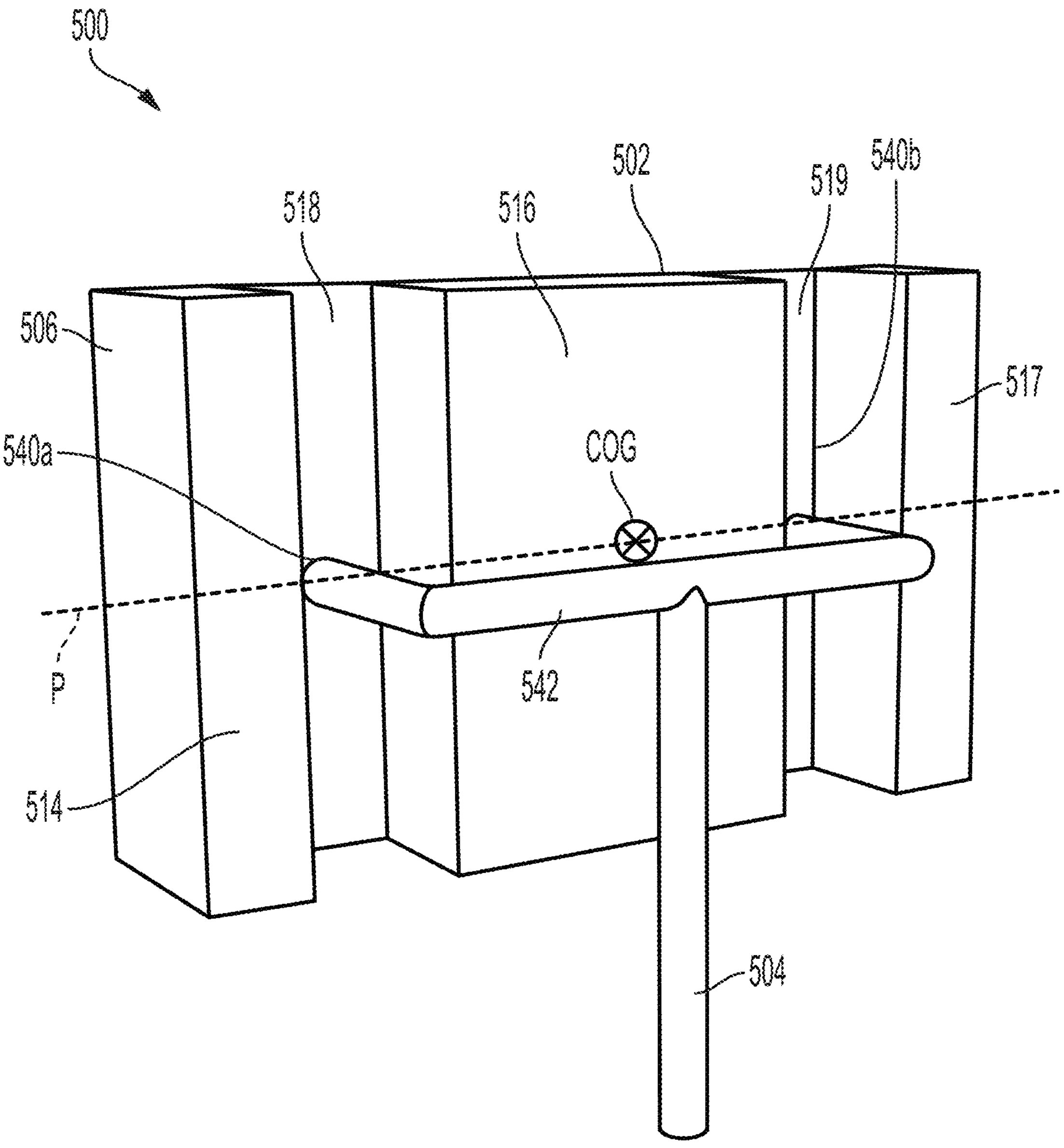
FIG. 18 is a rear perspective view of a lighting assembly in accordance with another exemplary embodiment of the present disclosure.

Referring to FIG. 18, there is shown a lighting assembly, generally designated 500, in accordance with another exemplary embodiment of the present invention. The lighting assembly 500 may be generally the same as the lighting assembly 100 except that it may include more than two compartments for housing electronic components. The lighting assembly 500 may include a lighting apparatus 502 similar to the lighting apparatus 102 except that the component housing 506 of the lighting apparatus 502 has a rear side including a first compartment 514, a second compartment 516 and a third compartment 517. The component housing 506 may include a front side receiving one or more light sources (not shown) in generally the same manner as the component housing 106 discussed above. Each of the compartments 514, 516, 517 may be configured to house the electronic components for controlling operation of the one or more light sources in generally the same manner as the compartments 114, 116 discussed above. In some embodiments, the second compartment 516 is spaced from the first compartment 514 by a first channel 118 and the third compartment 517 is spaced from the second compartment 516 by a second channel 119.

In some embodiments, the lighting assembly 502 includes a mounting assembly 504 that is generally the same as the mounting assembly 104 except that it may include a forked mount arm. The mounting assembly 504 may be configured to adjustably couple the lighting apparatus 502 to a support (not shown) such that the orientation of the lighting apparatus 502 may be selectively adjusted relative to the support in generally the same manner as the mounting assembly 104. The mounting assembly 504 may include a first joint 540*a* received within the first channel 518 and a second joint 540*b* received within the second channel 519. Each of the first joint 540*a* and second joint 540*b* may be generally the same as the first joint 140 discussed above. For example, each of the first and second joints 540*a*, 540*b* may be coupled to the component housing 506 and include a respective pivot shaft defining a pivot axis P. In some embodiments, both the first and second joints 540*a*, 540*b* are positioned along the same pivot axis P. For example, the respective pivot shafts of each of the joints 540*a*, 540*b* may extend along and circumferentially around a common pivot axis P.

In some embodiments, the first joint 540*a* and second joint 540*b* are translatable along the respective first channel 518, 519 between a use position and a stowage position in generally the same manner as the first joint 140 discussed above. In some embodiments, the mounting assembly 504 includes a mount arm 542 coupled to the component housing 506 by the first and second joints 540*a*, 540*b*. The mount arm 542 may be generally similar to the mount arm 142 except that it may be a forked arm coupled to both the first and second joints 540*a*, 540*b*.

In some embodiments, the mount arm 542 is rotatable relative to the first and second joints 540*a*, 540*b* about the common pivot axis P. For example, the mount arm 542 may be coupled to the first and second joints 540*a*, 540*b* via the respective pivot shafts in generally the same manner as the mount arm 142 discussed above. As such, the mount arm 542 may be rotatable relative to the lighting apparatus 502 about the pivot axis P. In some embodiments, when the first and second joints 540*a*, 540*b* are in the use position the pivot axis P extends through a center of gravity (COG) of the lighting apparatus 502. For example, the COG may lie on the pivot axis P while the first and second joints 540*a*, 540*b* are in the use position. In some embodiments, the first and second joints 540*a*, 540*b* are offset from the COG while in the use position and are contained within the perimeter of the lighting apparatus 502. In some embodiments, by providing a mount arm 542 having a forked arm configuration as discussed above, lighting apparatus of greater size and/or weight may be securely affixed thereto.

Figure 19:
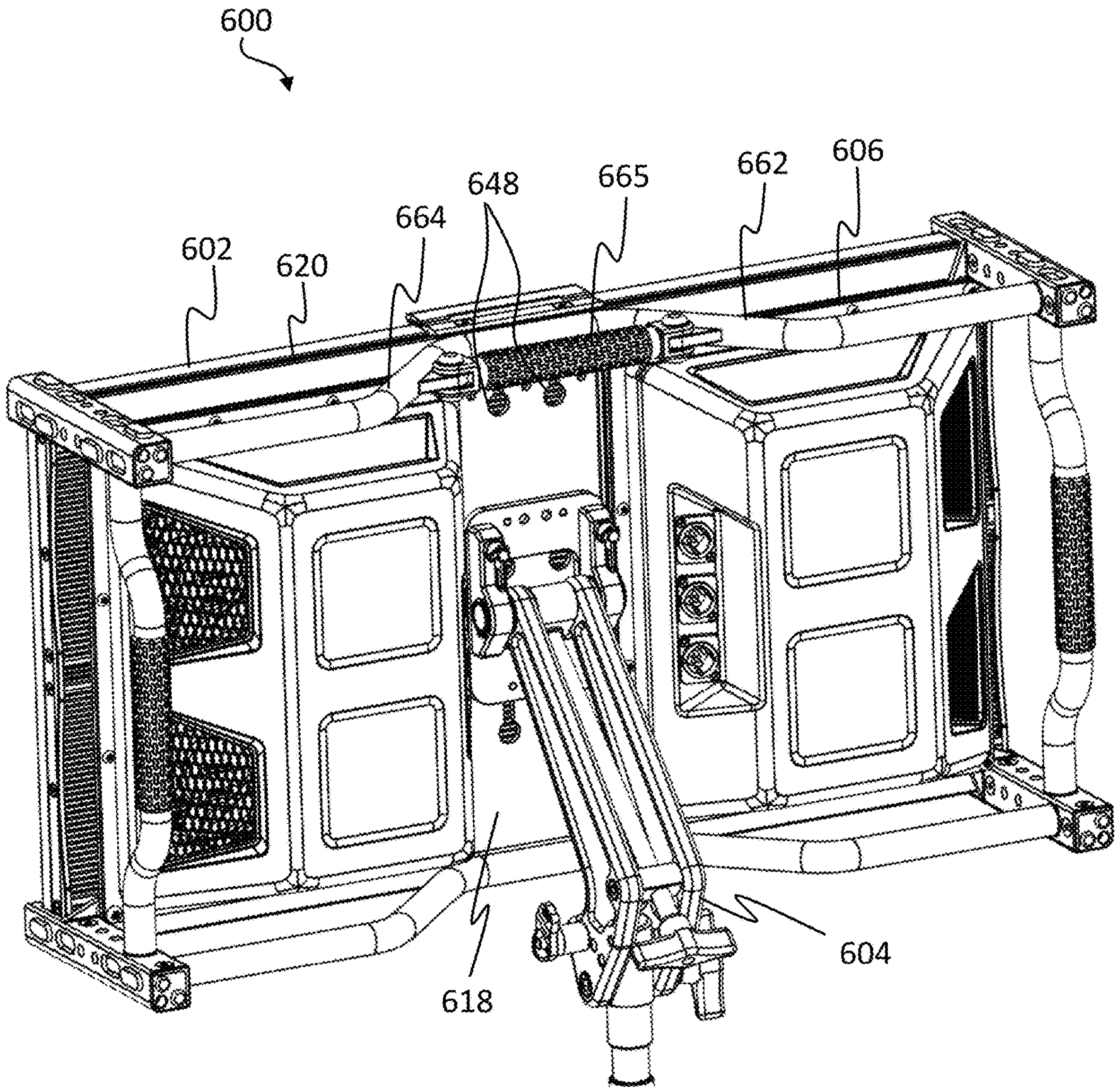
FIG. 19 is a rear perspective view of a lighting assembly in accordance with another exemplary embodiment of the present disclosure.
Figure 20:
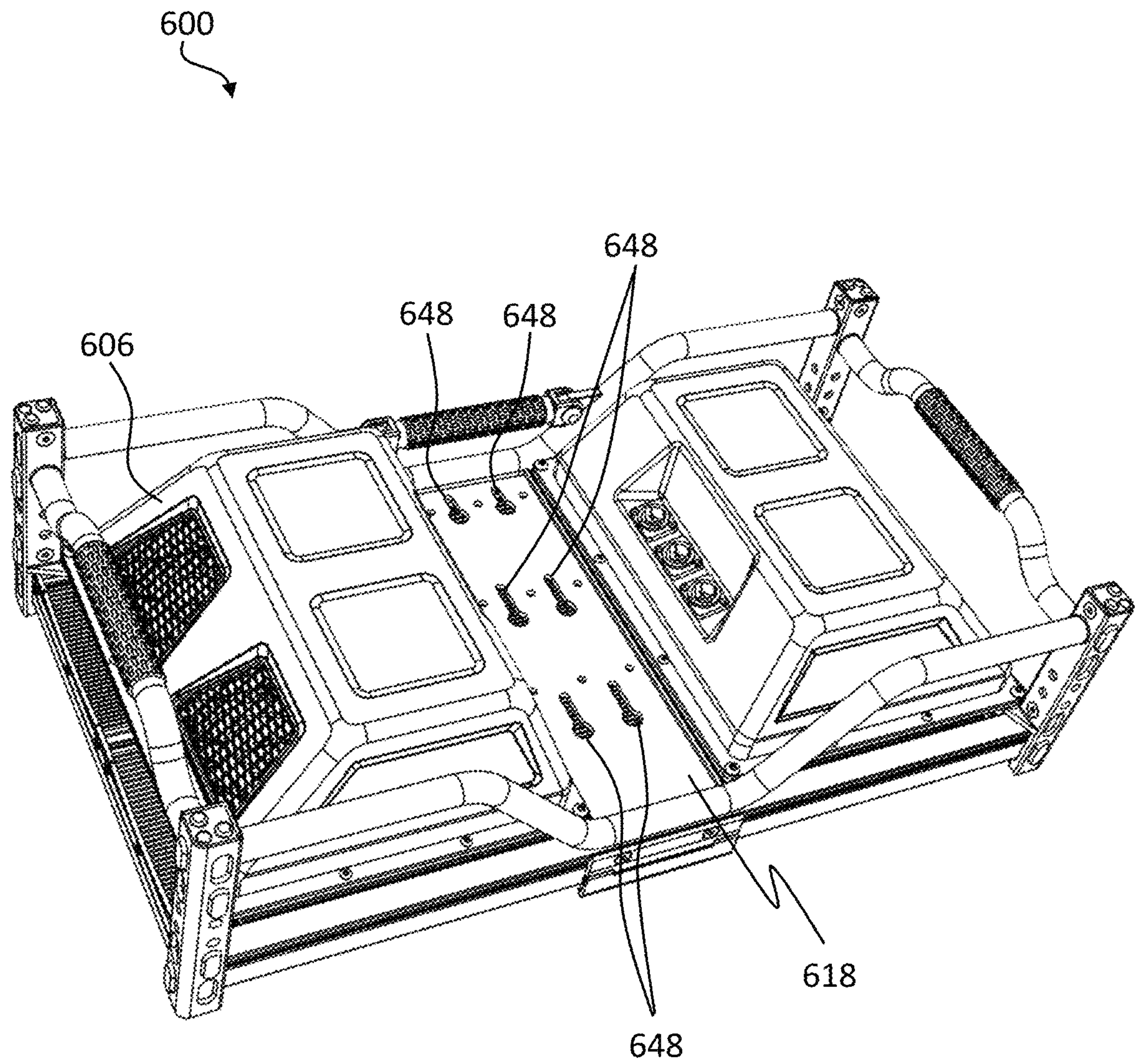
FIG. 20 is a rear perspective view of the lighting assembly of FIG. 19 with the mounting assembly omitted.
Figure 21:
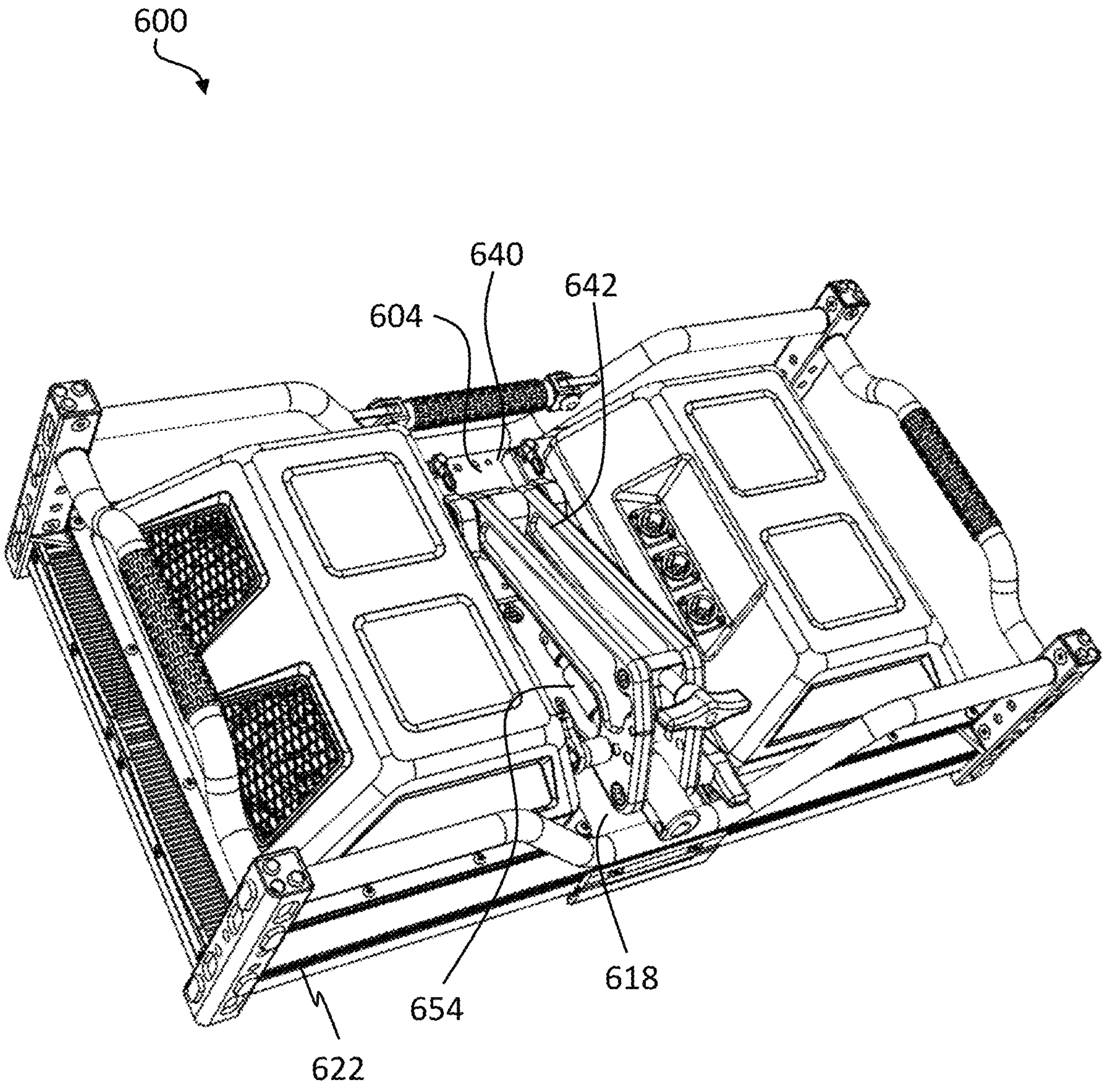
FIG. 21 is a rear perspective view of the lighting assembly of FIG. 19 in a storage position.

Referring to FIGS. 19-21, there is shown a lighting assembly, generally designated 600, in accordance with an exemplary embodiment of the present disclosure. The lighting assembly 600 may be generally the same as lighting assembly 100 except that it may include a handle 665 coupled to support beams 664 of frame 662. The lighting assembly 600 may include a lighting apparatus 602 generally the same as lighting apparatus 102 and/or a mounting assembly 604 generally the same as mounting assembly 104 as discussed above with regards to FIG. 1. The lighting apparatus 602 may include a component housing 606 at the rear surface thereof that is generally the same as component housing 606 except that the channel 618 may include tracks 648 positioned near the top surface 620 of the lighting apparatus 602.

The frame 662 may be generally the same as the frame 162 discussed above except it may include the handle 665 coupled to the support beams 664. In some embodiments, the handle 665 is positioned at the top surface 620 of the lighting apparatus 602. The handle 665 may be coupled to the support beams 664 where they curve towards the lighting apparatus 602. In some embodiments, the handle 665 is detachably coupled to the support beams 664. The handle 665 may be coupled to the support beams 664 via one or more fasteners (e.g., screws, bolts). The handle 665 may be generally centrally positioned along a width of the lighting assembly 600. The handle 665 may provide a gripping surface that is generally centered along the width of the lighting assembly 600, which may aid a user in grasping the lighting assembly 600 and transporting it.

The channel 618 may include tracks 648 proximate the top surface 620 of the lighting apparatus 602. In some embodiments, the tracks 648 enable the mounting assembly 604 to be stowed such that the support pin 654 is positioned between the mount arm 642 and channel 618. In FIG. 21, the mounting assembly 604 is shown in a stowage position in which the first joint 640 is coupled to the tracks 648 that are proximate the top surface 620. The first joint 640 may be substantially the same as first joint 140 and may couple to the tracks 648 in generally the same manner as the first joint 140 to tracks 148 as discussed above. The tracks 648 may be generally the same as tracks 148. In some embodiments, there are six tracks 648 spaced from one another along channel 618. In other embodiments, one or more of the tracks 658 may be continuous with one another. For example, tracks 648 aligned vertically with one another may be continuous with one another.

The mounting assembly 604 may be folded into the stowage position shown in FIG. 21 in generally the same as what is illustrated in FIGS. 6A-6C except that the first joint 640 is moved to the tracks 648 proximate the top surface 620 and the mount arm 642 is folded towards the bottom surface 622. In some embodiments, the stowage position of lighting assembly 600 may reduce the risk of the support pin 654 catching on external surfaces or physical objects. For example, when in the storage position the mount arm 642 covers the support pin 654 and the support pin is positioned within the channel 618. In some embodiments, one or more of the mounting assemblies 204, 304, and 404 may be used in conjunction with the lighting assembly 600. For example, the mounting assembly 604 may be replaced with one or more of mounting assemblies 204, 304 and 404.

It will be appreciated by those skilled in the art that changes could be made to the exemplary embodiments shown and described above without departing from the broad inventive concepts thereof. It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways.

Specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one". Finally, unless specifically set forth herein, a disclosed or claimed method should not be limited to the performance of their steps in the order written, and one skilled in the art can readily appreciate that the steps may be performed in any practical order.

What is claimed is:

1. A lighting assembly comprising:

a lighting apparatus comprising:

a component housing having a front side receiving one or more light sources and a rear side including a first compartment and a second compartment each for housing electronic components for controlling operation of the one or more light sources, the second compartment being spaced from the first compartment by a channel; and a mounting assembly configured to adjustably couple the lighting apparatus to a support such that the orientation of the lighting apparatus may be selectively adjusted relative to the support, the mounting assembly comprising:

a first joint received within the channel and coupled to the component housing, the first joint being translatable along the channel between a use position and a stowage position; and a mount arm coupled to the component housing by the first joint and rotatable relative to the joint about a pivot axis, wherein, when the first joint is in the use position the pivot axis extends through a center of gravity of the lighting apparatus.

2. The lighting assembly of claim 1, wherein the first joint passes through the center of gravity of the lighting apparatus when in the use position.

3. The lighting assembly of claim 1, wherein the first joint includes a pivot shaft extending along the pivot axis, and wherein when the first joint is in the use position the center of gravity is located at a geometric center of the pivot shaft.

4. The lighting assembly of claim 1, wherein the center of gravity is exterior to the component housing and located within the channel between the first and second compartments.

5. The lighting assembly of claim 1, wherein when the first joint is in the stowage position the pivot axis is offset from the center of gravity of the lighting apparatus.

6. The lighting assembly of claim 1, wherein the first joint is detachably coupled to the component housing.

7. The lighting assembly of claim 1, wherein the component housing is rotatable relative to the mount arm only about the pivot axis.

8. The lighting assembly of claim 1, wherein an inner sidewall of the first compartment and an inner sidewall of the second compartment at least partially define the channel.

9. The lighting assembly of claim 1, wherein the channel is open at a top and bottom surface of the lighting apparatus.

10. The lighting assembly of claim 1 wherein the lighting apparatus further includes:

a frame coupled to the component housing along a perimeter thereof and defining a maximum length, width and height of the lighting apparatus.

11. The lighting assembly of claim 10, wherein when the first joint is in the stowage position the mounting assembly is contained entirely within a volume defined by the maximum length, width and height of the lighting apparatus.

12. The lighting assembly of claim 1 further comprising a control panel positioned at a rear surface of one of the first and second compartments, the control panel configured to permit a user to control operation of the one or more light sources.

13. The lighting assembly of claim 1 further comprising an air vent at an outer sidewall of the first compartment and/or second compartment configured to permit air flow between an interior of the component housing and an environment surrounding the component housing.

14. The lighting assembly of claim 1, wherein the first and second compartments have a generally trapezoidal prism shape.

15. The lighting assembly of claim 1, wherein a mouth of the channel at a rear surface of first and second compartments has a width greater than a width of a base wall of the channel.

16. The lighting assembly of claim 1, wherein a base wall in channel has a track that restricts the translation of the first joint along the channel.

17. The lighting assembly of claim 1, wherein the mounting assembly further includes:

a support attachment pin configured to couple the mount arm to the support; and a second joint coupling the mount arm to the support attachment pin.

18. The lighting assembly of claim 17, wherein the support attachment pin extends along a longitudinal axis defining a first axis of rotation for the lighting apparatus relative to the support when the lighting apparatus is coupled to the support by the mounting assembly.

19. The lighting assembly of claim 18, wherein the second joint defines a second axis of rotation for the lighting apparatus relative to the support that is perpendicular to the longitudinal axis of the support attachment pin.

20. The lighting assembly of claim 1, wherein the first joint is positioned within a perimeter of the lighting apparatus.

21. The lighting assembly of claim 1, wherein the first joint is a ball joint.

22. The lighting assembly of claim 1, wherein the center of gravity of the lighting apparatus is offset from a center of geometry of the lighting apparatus.

23. A lighting assembly comprising:

a lighting apparatus comprising:

a component housing having a front side receiving one or more light sources and a rear side including a first compartment, a second compartment and a third component each for housing electronic components for controlling operation of the one or more light sources, the second compartment being spaced from the first compartment by a first channel and the third compartment being spaced from the second compartment by a second channel; and a mounting assembly configured to adjustably couple the lighting apparatus to a support such that the orientation of the lighting apparatus may be selectively adjusted relative to the support, the mounting assembly comprising:

a first joint received within the first channel and coupled to the component housing, the first joint being translatable along the first channel between a use position and a stowage position;

a second joint received within the second channel and coupled to the component housing, the second joint being translatable along the second channel between the use position and the stowage position; and a mount arm coupled to the component housing by the first joint and second joint and rotatable relative to the first and second joints about a common pivot axis, wherein, when the first and second joint in the use position the common pivot axis extends through a center of gravity of the lighting apparatus.

* * * * *